United States Patent
Suga et al.

(10) Patent No.: US 12,194,416 B2
(45) Date of Patent: Jan. 14, 2025

(54) MEMBRANE DISTILLATION MODULE AND MEMBRANE DISTILLATION APPARATUS

(71) Applicant: Asahi Kasei Kabushiki Kaisha, Tokyo (JP)

(72) Inventors: Yuki Suga, Tokyo (JP); Hiroyuki Arai, Tokyo (JP); Tomotaka Hashimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 187 days.

(21) Appl. No.: 17/296,595

(22) PCT Filed: Nov. 27, 2019

(86) PCT No.: PCT/JP2019/046457
§ 371 (c)(1),
(2) Date: May 25, 2021

(87) PCT Pub. No.: WO2020/111158
PCT Pub. Date: Jun. 4, 2020

(65) Prior Publication Data
US 2022/0001331 A1 Jan. 6, 2022

(30) Foreign Application Priority Data
Nov. 27, 2018 (JP) ................. 2018-221125

(51) Int. Cl.
*B01D 61/36* (2006.01)
*B01D 63/02* (2006.01)
(Continued)

(52) U.S. Cl.
CPC ......... *B01D 61/366* (2013.01); *B01D 61/364* (2013.01); *B01D 61/368* (2013.01);
(Continued)

(58) Field of Classification Search
None
See application file for complete search history.

(56) References Cited

U.S. PATENT DOCUMENTS 4,961,760 A 10/1990 Caskey et al.
5,837,032 A * 11/1998 Moll ............. C08G 75/06
95/52
(Continued)

FOREIGN PATENT DOCUMENTS

JP S62-279808 A 12/1987
JP H04-135631 A 5/1992
(Continued)

OTHER PUBLICATIONS

Supplementary European Search Report issued in corresponding European Patent Application No. 19891014.3 dated Dec. 20, 2021.
(Continued)

*Primary Examiner* — Krishnan S Menon
(74) *Attorney, Agent, or Firm* — Morgan, Lewis & Bockius LLP

(57) ABSTRACT

A membrane distillation module comprising a membrane distillation cartridge and a membrane distillation housing, wherein: the cartridge comprises a anchoring part in which porous membranes are anchored by resin; the housing comprises a housing body and a housing lid; the membrane distillation module comprises a support part where the outer surface of the anchoring part is supported by the inner surface of the housing with a seal member interposed therebetween; and a value C in the cross section of the support part is at least 30° C. as represented by the formula, where $d_F$ is the equivalent circular diameter (mm) of the outer circumference of the anchoring part, $k_F$ is the linear expansion coefficient (1/° C.) of the resin, $d_E$ is the equivalent diameter (mm) of the inner circumference of the hous- (Continued)

ing, and $k_E$ is the linear expansion coefficient (1/° C.) of a portion where the housing contacts the seal member.

15 Claims, 16 Drawing Sheets

(51) Int. Cl.
    *B01D 63/04* (2006.01)
    *B01D 63/10* (2006.01)
    *B01D 63/14* (2006.01)
    *B01D 69/02* (2006.01)
    *C02F 1/44* (2023.01)

(52) U.S. Cl.
    CPC ..... *B01D 63/0222* (2022.08); *B01D 63/0233* (2022.08); *B01D 63/04* (2013.01); *B01D 63/10* (2013.01); *B01D 63/14* (2013.01); *B01D 69/02* (2013.01); *C02F 1/447* (2013.01); *B01D 2313/025* (2013.01); *B01D 2313/041* (2022.08); *B01D 2313/201* (2022.08); *B01D 2313/21* (2013.01); *B01D 2313/22* (2013.01); *B01D 2313/23* (2013.01); *B01D 2313/44* (2013.01); *B01D 2313/90* (2013.01); *B01D 2319/04* (2013.01); *B01D 2325/38* (2013.01)

(56) References Cited

U.S. PATENT DOCUMENTS

| | | | |
|---|---|---|---|
| 9,764,275 | B2 | 9/2017 | Schletz et al. |
| 2003/0111416 | A1 | 6/2003 | Kubota et al. |
| 2004/0045893 | A1 | 3/2004 | Watanabe et al. |
| 2005/0121391 | A1* | 6/2005 | Koch ............... B01D 63/043 210/321.79 |
| 2015/0298997 | A1 | 10/2015 | Shimizu et al. |
| 2016/0038879 | A1 | 2/2016 | Yamaguchi et al. |
| 2016/0045858 | A1* | 2/2016 | Schletz ............. B01D 63/02 96/10 |
| 2017/0173536 | A1* | 6/2017 | Nagata ............... B01D 61/36 |
| 2020/0109070 | A1 | 4/2020 | Hashimoto et al. |

FOREIGN PATENT DOCUMENTS

| | | |
|---|---|---|
| JP | H05-051432 U | 7/1993 |
| JP | H06-254355 A | 9/1994 |
| JP | 2002-543959 A | 12/2002 |
| JP | 2004-049976 A | 2/2004 |
| JP | 2004-209418 A | 7/2004 |
| JP | 2011-200770 A | 10/2011 |
| JP | 2013-034928 A | 2/2013 |
| JP | 2016-190220 A | 11/2016 |
| JP | 2018-083189 A | 5/2018 |
| KR | 10-2018-0001849 A | 1/2018 |
| WO | 00/67885 A1 | 11/2000 |
| WO | 01/53213 A1 | 7/2001 |
| WO | 2013/179414 A1 | 12/2013 |
| WO | 2015/080125 A1 | 6/2015 |
| WO | 2016/006670 A1 | 1/2016 |
| WO | 2018/174279 A1 | 9/2018 |

OTHER PUBLICATIONS

Dow: "Product Information D.E.R: TM 330", Dow, XP055871191, Retrieved from the Internet: URL:https://www.palmerholland.com/Assets/User/Documents/Product/42093/369/MITM02863.pdf (Dec. 9, 2021).

"Temperature Expansion Coefficients common Piping Materials", XP055871187, Retrieved from the Internet: URL: https://www.engineeringtoolbox.com/pipes-temperature-expansion-coefficients-d_48.html (Dec. 9, 2021).

International Search Report issued in corresponding International Patent Application No. PCT/JP2019/046457 dated Feb. 18, 2020.

International Preliminary Report on Patentability and Written Opinion issued in corresponding International Patent Application No. PCT/JP2019/046457 dated Jun. 10, 2021.

* cited by examiner

MEMBRANE DISTILLATION MODULE AND MEMBRANE DISTILLATION APPARATUS

FIELD

The present invention relates to a membrane distillation module which is composed of a membrane cartridge for membrane distillation and a housing, and a membrane distillation apparatus comprising the same.

The present invention relates to a membrane distillation module which uses a module in a state in which a cartridge, in which a hydrophobic porous membrane is housed, is housed inside a housing to pass treatment target water through a liquid phase unit of the module, discharge water vapor from the gas phase unit thereof, cool and condense the water vapor, and recover the water vapor as distilled water, and a membrane distillation apparatus using the same.

BACKGROUND

The membrane distillation method uses a hydrophobic porous membrane which allows only water vapor to permeate from the treatment target water, and is a method of obtaining distilled water from heated treatment target water (high temperature water) by condensing water vapor that has passed through the porous membrane due to a pressure difference of saturated water vapor. The membrane distillation method does not require a high driving force as compared with the reverse osmosis method in which pressure is applied to filter treatment target water to obtain purified water, whereby motive energy can be reduced. The membrane distillation method has extremely high separation performance for non-volatile solutes such as salts, whereby high-purity water can be obtained.

The conventional membrane distillation method has an advantage in that high-purity distilled water can be obtained because the liquid does not enter the interior of the membrane and only vapor passes through the membrane in a state in which the membrane is dry. However, when the membrane is used for long periods of time, or when treatment target water with a small surface tension is used, "wetting" occurs in which the treatment target water passes through the membrane, which may cause problems such as mixing of raw water (treatment target water) in the distilled water and a decrease in distillation efficiency. Wetting is related to the pore size of the membrane, the hydrophobicity of the membrane, and the surface tension of treatment target liquid. It is known that the pore size or surface porosity of the porous membrane used for membrane distillation contributes to the vapor permeation performance of the membrane and the compactness of the membrane distillation apparatus associated therewith (Patent Literature 1 and 2).

Patent Literature 1 proposes, from the viewpoint of vapor permeation performance retention rate and membrane surface scratch resistance, the use of a porous hollow-fiber membrane having an shell surface porosity of 20% to less than 50% and composed of a polyolefin, olefin-halogenated olefin copolymer, or halogenated polyolefin as a porous membrane for membrane distillation.

Patent Literature 2 proposes a hydrophobic porous hollow fiber membrane having a surface porosity of 20% to 70% on the surface of the membrane in contact with the treatment target water as a membrane used in a membrane distillation apparatus having water treatment capacity and compactness, and from the viewpoint of suppressing wetting, an average pore diameter of 10 µm or less is investigated.

Modifying the surface of a porous membrane to suppress wetting in membrane distillation is known (Patent Literature 3). Patent Literature 3 describes treating the surface of a porous membrane composed of polytetrafluoroethylene (PTFE) or polyvinylidene fluoride (PVDF) with a fluorinated monomer or a polymer thereof to impart liquid-repellency in order to prevent the surface of the porous membrane from being covered with oil and becoming easily wet.

As described above, the membrane distillation method uses the vapor pressure difference generated through the hydrophobic porous membrane as a driving force. In order to increase the vapor pressure difference between the front and back of the porous medium, methods such as setting the vapor permeation side of the membrane to a reduced pressure state and heating the treatment target water to a higher temperature can be exemplified. It is considered that the amount of water produced per membrane surface area can be improved by increasing the vapor pressure difference between the front and back surfaces of the hydrophobic porous membrane using these methods.

CITATION LIST

Patent Literature

[PTL 1] WO 2001/053213
[PTL 2] WO 2016/006670
[PTL 3] WO 2015/080125

SUMMARY

Technical Problem

When membrane distillation is carried out under reduced pressure, the vapor flow rate increases significantly due to the increase in the amount of vapor due to the improvement in the amount of water produced and the increase in the volume of vapor in a reduced pressure state. Therefore, in membrane distillation under reduced pressure, pressure loss occurs on the front and back of the porous membrane, and there is a problem in that the vapor pressure difference may be lost. The coefficient of linear expansion is often different between the components of the housing of the membrane distillation module and the adhesive for affixing the porous membrane to the housing of the membrane distillation module. Thus, in particular under high temperature conditions, there is a problem in that the amount of dimensional change of each part will be different, whereby the adhesive (in particular the adhesive interface) will peel off, and the airtightness inside the membrane distillation module will be impaired.

If membrane distillation is continuously carried out for a long period of time, the porous membrane may become contaminated or may deteriorate. In such a case, it is necessary to wash or replace the membrane, but in conventional membrane distillation apparatuses, these operations are complicated.

The object of the present invention is to eliminate these problems, and to provide a membrane distillation module and membrane distillation apparatus which can absorb the difference in the amount of dimensional change of each member due to the difference in coefficient of linear expansion even under reduced pressure and high temperature conditions, whereby the airtightness inside the module and the reduced pressure state can be maintained, highly efficient membrane distillation can be carried out for long periods of time, and it is easy to clean and replace a membrane when the membrane has become contaminated or deteriorated.

Solution to Problem

As a result of rigorous investigation and experimentation to solve the above problems, the present inventors have invented a membrane distillation module composed of a membrane cartridge for membrane distillation and a housing. The present invention is as described below.

<<Aspect 1>>

A membrane cartridge for membrane distillation, comprising a flat sheet or hollow fiber hydrophobic porous membrane.

<<Aspect 2>>

A membrane distillation module, comprising:
the membrane cartridge for membrane distillation according to Aspect 1, and
a membrane distillation housing which houses the membrane cartridge for membrane distillation.

<<Aspect 3>>

The membrane distillation module according to Aspect 2, wherein the membrane cartridge for membrane distillation has a membrane affixation part in which a hydrophobic porous membrane is affixed with an affixation resin, and
in a cross-section perpendicular to an axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), the membrane distillation module has a value C represented by the following formula:

$$C = \frac{d_E - d_F}{d_F(k_F - k_E)} \quad \text{[Formula 1]}$$

of 30° C. or greater.

<<Aspect 4>>

A membrane distillation module, comprising:
a membrane cartridge for membrane distillation having a flat sheet or hollow fiber hydrophobic porous membrane, and
a membrane distillation housing which houses the membrane cartridge for membrane distillation, wherein
the membrane cartridge for membrane distillation:
  has a substantially columnar or substantially polygonal columnar shape, and
  has a membrane affixation part which affixes the hydrophobic porous membrane to the axial direction ends of the substantially columnar or substantially polygonal columnar shape with an affixation resin,
the membrane distillation housing has a housing body for housing the membrane cartridge for membrane distillation and one or two housing lids attached to the housing body,
the membrane distillation module has a support unit which, when the membrane cartridge for membrane distillation is housed within the membrane distillation housing, affixes the membrane cartridge for membrane distillation within the membrane distillation housing by supporting an outside surface of the membrane affixation part on an inside surface of the membrane distillation housing via a sealing member,
the membrane distillation module is divided into a liquid phase unit through a treatment target liquid circulates and a gas phase unit in which vapor generated from the treatment target liquid passes through the hydrophobic porous membrane and diffuses by the hydrophobic porous membrane, the membrane affixation part, and the sealing member, and
in a cross-section of the support unit perpendicular to the axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), the membrane distillation module has a value C represented by the following formula:

$$C = \frac{d_E - d_F}{d_F(k_F - k_E)} \quad \text{[Formula 2]}$$

of 30° C. or greater.

<<Aspect 5>>

The membrane distillation module according to Aspect 4, wherein the sealing member is connected to an outer circumferential surface of the membrane affixation part of the membrane cartridge for membrane distillation, and
a length of the sealing member in the direction perpendicular to the axial direction of the membrane cartridge for membrane distillation is 1 mm or greater.

<<Aspect 6>>

The membrane distillation module according to Aspect 4 or 5, wherein at least a part of a portion of the membrane cartridge for membrane distillation other than the axial direction ends is covered by at least one of a net and a non-woven fabric.

<<Aspect 7>>

The membrane distillation module according to any one of Aspects 4 to 6, further comprising at least one rod-shaped structure which is affixed with the affixation resin of the axial direction ends of the membrane cartridge for membrane distillation.

<<Aspect 8>>

The membrane distillation module according to Aspect 7, wherein the rod-shaped structure is hollow and has holes in a side surface thereof, and
the interior of the hollowness of the rod-shaped structure is connected to the gas phase unit of the membrane distillation module.

<<Aspect 9>>

The membrane distillation module according to Aspect 8, wherein the rod-shaped structure is a porous structure, and
pores of the rod-shaped structure are connected to the gas phase unit of the membrane distillation module.

<<Aspect 10>>

The membrane distillation module according to any one of Aspects 4 to 9, wherein the flat sheet hydrophobic porous membrane is a pleated hydrophobic porous membrane.

<<Aspect 11>>

The membrane distillation module according to any one of Aspects 4 to 9, wherein the hydrophobic porous membrane is a spiral hydrophobic porous membrane.

<<Aspect 12>>

The membrane distillation module according to Aspect 10, wherein a portion of the membrane cartridge for membrane distillation other than the axial direction ends thereof are covered by a cartridge case, the cartridge case has a cartridge case aperture unit, the aperture area of the cartridge case aperture unit is 1/250 or more of the membrane surface area of the hydrophobic porous membrane, and the ratio ($k_C/k_F$) of the coefficient of linear expansion $k_C$ of the material constituting the cartridge case to the coefficient of linear expansion $k_F$ of the affixation resin is 0.3 to less than 4.0.

<<Aspect 13>>

The membrane distillation module according to any one of Aspects 4 to 10 or 12, wherein the housing body has, on a side surface part thereof, a vapor outlet which is connected to the gas phase unit of the membrane distillation module and for discharging vapor in the gas phase unit to the outside of the membrane distillation module, and the aperture area of the vapor outlet is 1/250 or more of the membrane surface area of the hydrophobic porous membrane.

<<Aspect 14>>

The membrane distillation module according to any one of Aspects 4 to 12, wherein the housing body comprises:

a cooler which is connected to the gas phase unit of the membrane distillation module and for condensing the vapor in the gas phase unit, and a distilled water discharge unit for discharging distilled water which is condensed from the vapor by the cooler.

<<Aspect 15>>

The membrane distillation module according to Aspect 14, wherein the housing body has an exhaust port for decompressing the gas phase unit.

<<Aspect 16>>

The membrane distillation module according to any one of Aspects 13 to 15, wherein the housing body has a demister.

<<Aspect 17>>

The membrane distillation module according to any one of Aspects 4 to 9 and 12 to 16, wherein the hydrophobic porous membrane is composed of a plurality of hollow fiber hydrophobic porous membranes, and the plurality of hollow fiber hydrophobic porous membranes are divided into a plurality of small bundles, and the plurality of small bundles are dispersedly arranged in a cross-section of the membrane affixation part in a direction perpendicular to the axial direction of the membrane cartridge for membrane distillation.

<<Aspect 18>>

The membrane distillation module according to Aspect 11, wherein when the membrane cartridge for membrane distillation is housed within the membrane distillation housing, a vapor discharge pipe which is connected to the gas phase unit of the membrane distillation module and which is for discharging vapor in the gas phase unit to the outside of the membrane distillation module, protrudes from the membrane distillation module to the outside.

<<Aspect 19>>

The membrane distillation module according to any one of Aspects 4 to 18, wherein at least a part of the outside of the membrane distillation housing has a heat insulation layer.

<<Aspect 20>>

A membrane distillation apparatus, comprising at least:

the membrane distillation module according to any one of Aspects 4 to 13 and 16 to 19, and a vapor condensation unit for condensing vapor generated from the membrane distillation module.

<<Aspect 21>>

A membrane distillation apparatus, comprising at least the membrane distillation module according to Aspect 14 or 15.

Advantageous Effects of Invention

The membrane distillation module of the present invention can be divided into the membrane cartridge for membrane distillation and the membrane distillation housing, whereby only the membrane cartridge for membrane distillation can be removed for transportation or can easily be replaced. By using a suitable sealing member in the gap between the membrane cartridge for membrane distillation and the membrane distillation housing, dimensional changes under high temperature operation can be absorbed, and highly efficient membrane distillation can be continuously carried out for long periods of time.

BRIEF DESCRIPTION OF DRAWINGS

FIG. 1(A) is a schematic cross-sectional view, and FIG. 1(B) is a cross-section view taken along line A-A of FIG. 1(A).

FIG. 5(A) is a schematic cross-sectional view, and FIG. 5(B) is a cross-sectional view taking along line A-A of FIG. 5(A).

DESCRIPTION OF EMBODIMENTS

Figure 1:
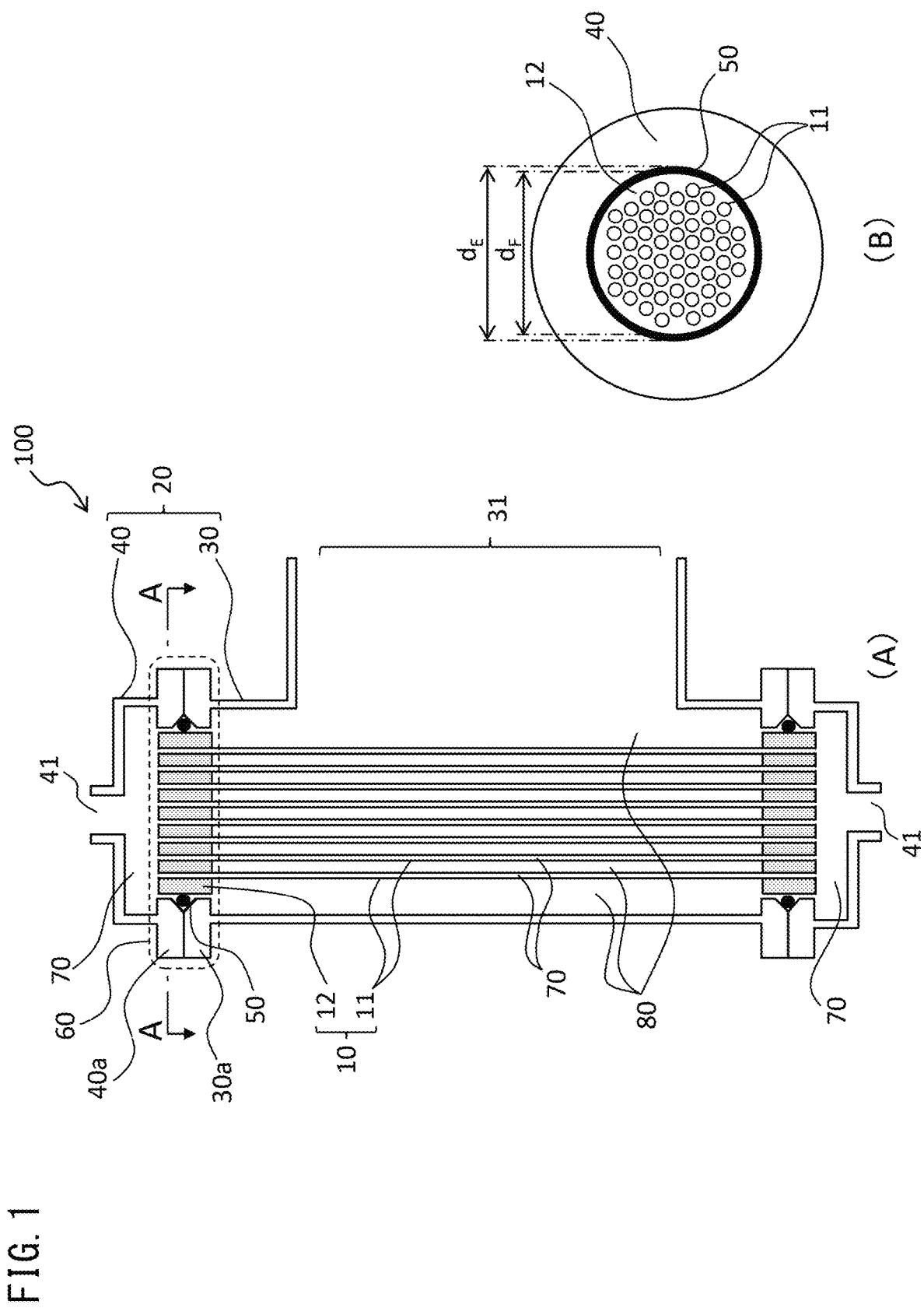
FIG. 1 is a schematic view showing the structure of an example of the membrane distillation module of the present invention.

The modes for carrying out the preset invention (hereinafter referred to as the "present embodiment") will be described in detail below. The present invention is not limited to the following embodiments, and various changes can be made within the scope of the gist thereof. In the present disclosure, identical reference signs assigned in the drawings indicate identical or similar elements.

The membrane distillation module of the present invention comprises a membrane cartridge for membrane distillation and a membrane distillation housing in which this membrane cartridge for membrane distillation is housed.

The membrane cartridge for membrane distillation comprises a flat sheet or hollow fiber hydrophobic porous membrane. The membrane cartridge for membrane distillation preferably comprises a membrane affixation part which affixes the hydrophobic porous membrane with an affixation resin. In a more preferable aspect, the membrane cartridge for membrane distillation has a substantially columnar or substantially polygonal columnar shape, and the membrane affixation part is present on the axial direction ends of the substantially columnar or substantially polygonal columnar shape.

The membrane distillation housing preferably comprises a housing body for housing the membrane cartridge for membrane distillation and one or two housing lids attached to the housing body.

In a cross-section perpendicular to the axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), the membrane distillation module of the present invention preferably has a value C represented by the following formula:

$$C = \frac{d_E - d_F}{d_F(k_F - k_E)} \quad \text{[Formula 3]}$$

of 30° C. or greater.

The membrane distillation module of the present invention may comprise a support unit which, when the membrane cartridge for membrane distillation is housed within the membrane distillation housing, affixes the membrane cartridge for membrane distillation within the membrane distillation housing by supporting an outside surface of the membrane affixation part of the membrane cartridge for membrane distillation on an inside surface of the membrane distillation housing via the sealing member.

The membrane distillation module of the present invention may be divided, when the membrane cartridge for membrane distillation is housed within the membrane distillation housing, into a liquid phase unit through which a treatment target liquid circulates and a gas phase unit in which vapor generated from the treatment target liquid passes through the hydrophobic porous membrane and diffuses by the hydrophobic porous membrane and the membrane affixation part of the membrane cartridge for membrane distillation and the sealing member.

The "axial direction" of the membrane cartridge for membrane distillation may be the axial direction of the substantially columnar or substantially polygonal columnar shape of the membrane cartridge for membrane distillation. When calculating the value C by the above formula, the coefficient of linear expansion of the material constituting the housing body in the portion in which the membrane distillation housing contacts the sealing member may be used as the coefficient of linear expansion $k_E$ of the constituent material of the membrane distillation housing.

In other words, the membrane distillation module of a preferred aspect of the preset invention is a membrane distillation module comprising:
a membrane cartridge for membrane distillation having a flat sheet or hollow fiber hydrophobic porous membrane, and
a membrane distillation housing which houses the membrane cartridge for membrane distillation, wherein
the membrane cartridge for membrane distillation:
has a substantially columnar or substantially polygonal columnar shape, and
has a membrane affixation part which affixes the hydrophobic porous membrane to the axial direction ends of the substantially columnar or substantially polygonal columnar shape with an affixation resin,
the membrane distillation housing has a housing body for housing the membrane cartridge for membrane distillation and one or two housing lids attached to the housing body,
the membrane distillation module has a support unit which, when the membrane cartridge for membrane distillation is housed within the membrane distillation housing, affixes the membrane cartridge for membrane distillation within the membrane distillation housing by supporting an outside surface of the membrane affixation part on an inside surface of the membrane distillation housing via a sealing member, the membrane distillation module is divided into a liquid phase unit through a treatment target liquid circulates and a gas phase unit in which vapor generated from the treatment target liquid passes through the hydrophobic porous membrane and diffuses by the hydrophobic porous membrane, the membrane affixation part, and the sealing member, and in a cross-section of the support unit perpendicular to the axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), the membrane distillation module has a value C represented by the following formula:

$$C = \frac{d_E - d_F}{d_F(k_F - k_E)} \quad \text{[Formula 4]}$$

of 30° C. or greater.

Each element included in the membrane distillation module of the preferred aspect of the preset invention will be described in order below.

<<Membrane Cartridge for Membrane Distillation>>

The membrane cartridge for membrane distillation comprises a flat sheet or hollow fiber hydrophobic porous membrane, has a substantially columnar or substantially polygonal columnar shape, and has a membrane affixation part which affixes the hydrophobic porous membrane to the axial direction ends of the substantially columnar or substantially polygonal columnar shape with an affixation resin.

The phrase "substantially columnar" in the shape of the membrane cartridge for membrane distillation encompasses, for example, columnar shapes, elliptical columnar shapes, and shapes similar thereto. The phrase "substantially polygonal columnar" encompasses, for example, polygonal columns having a polygon whose bottom surface is a polygon having 3 to 100 vertices, and shapes similar thereto. The phrase "shapes similar thereto" encompasses shapes such as cylinders and polygonal prisms with cut corners, shapes with rounded corners, shapes with curved or bent shafts, and combinations thereof. As the shape of the membrane cartridge for membrane distillation, a columnar shape, an elliptical columnar shape, a polygonal columnar shape having a polygon having 4 to 12 vertices as the bottom surface, and shapes similar thereto are preferable, and cylindrical, elliptical, tetragonal, and similar shapes are more preferable.

The membrane cartridge for membrane distillation may be constituted from only the hydrophobic porous membrane and the affixation resin, and may optionally include, in addition thereto, one or more members selected from, for example, a rod-shaped structure, a net, a non-woven fabric, and a cartridge case.

The cartridge for membrane distillation of the present invention can be used as a membrane distillation module in combination with the membrane distillation housing, which is described later, whereby in addition to producing useful effects, it can also be used as an element to be incorporated into a system having other functions.

<Hydrophobic Porous Membrane>

It is necessary that the hydrophobic porous membrane according to the present embodiment have pores (penetrated holes) penetrating from one surface of the membrane to the other surface. The penetrated holes may be included in the network of the membrane material such as a polymer, and may be branched holes or direct holes. These pores must allow vapor to pass therethrough but not allow the treatment target water (liquid) to pass therethrough.

It is necessary that the porous membrane be hydrophobic to prevent wetting. The water contact angle is an index representing hydrophobicity. In the present embodiment, the water contact angle of any part of the hydrophobic porous membrane is preferably 90° or more, more preferably 110° or more, and further preferably 120° or more. The upper limit of the water contact angle is not particularly limited, but in practice, is preferably approximately 150° or less.

The water contact angle is measured by the sessile drop method. The sessile drop method is a method in which, for example, 2 μL of pure water is dropped onto the surface of the object to be measured, and the angle formed by the object to be measured and the droplet is quantified by analysis from a projected image.

The pore size and pore size distribution of the hydrophobic porous membrane also have a strong causal relationship with wetting suppression.

The average pore size of the hydrophobic porous membrane is preferably in the range of 0.01 μm to 1.0 μm, and more preferably in the range of 0.03 μm to 0.6 μm. If the average pore size is less than 0.01 μm, the vapor permeation resistance becomes excessively great, and the distilled water production rate becomes low, and if it exceeds 1.0 μm, it becomes difficult to suppress wetting even if the hydrophobicity of the membrane is increased, which is not suitable. From the viewpoint of achieving both the distilled water production rate and the suppression of wetting, it is preferable that the pore size distribution of the hydrophobic porous membrane is narrow. Specifically, it is preferable to have a pore size distribution in which the ratio of the maximum pore diameter to the average pore diameter is in the range of 1.2 to 2.5.

From the viewpoint of the distilled water production rate, the porosity of the hydrophobic porous membrane is preferably 50% by volume to 85% by volume. If this value is less than 50% by volume, the distilled water production rate is low, and if it is greater than 85% by volume, the strength of the membrane itself is reduced, and problems such as breakage may occur during long-term use, which is not suitable.

The form of the hydrophobic porous membrane is hollow fiber or flat sheet.

The flat sheet hydrophobic porous membrane may be pleated or may be a spiral.

Figure 2:
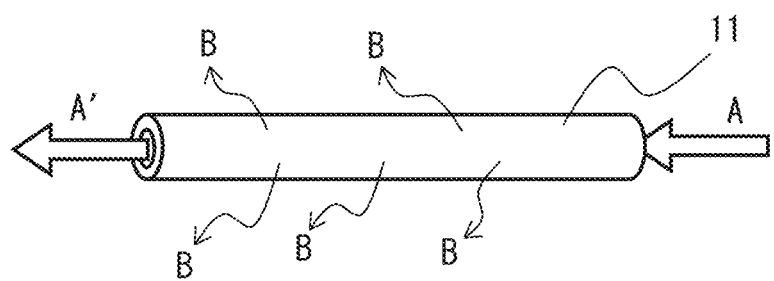
FIG. 2 is a schematic view detailing the form and function of a hollow fiber hydrophobic porous membrane.

FIG. 2 shows an example of a hollow fiber hydrophobic porous membrane.

The hydrophobic porous membrane (11) of FIG. 2 has a hollow fiber (cylindrical) shape, and the outer wall is constituted by the hydrophobic porous membrane. The treatment target water (A) is introduced, for example, into the bore side of the hydrophobic porous membrane (11). The vapor (B) separated from the treatment target water passes through the outer wall of the hollow fiber and diffuses to the outside of the hollow fiber, and the distilled treatment target water (A') passes through the bore side of the hydrophobic porous membrane (11) and is discharged to the outside. A configuration in which the treatment target water (A) is introduced from the shell side of the hydrophobic porous membrane (11), and the vapor (B) separated from treatment target water passes through the outer wall of the hollow fiber and diffuses into the bore side of the hollow fiber may be adopted.

When the hydrophobic porous membrane is hollow fiber, it is preferable that the axial direction of the membrane cartridge for membrane distillation coincide with the axial direction of the hollow fiber hydrophobic porous membrane.

Figure 3:
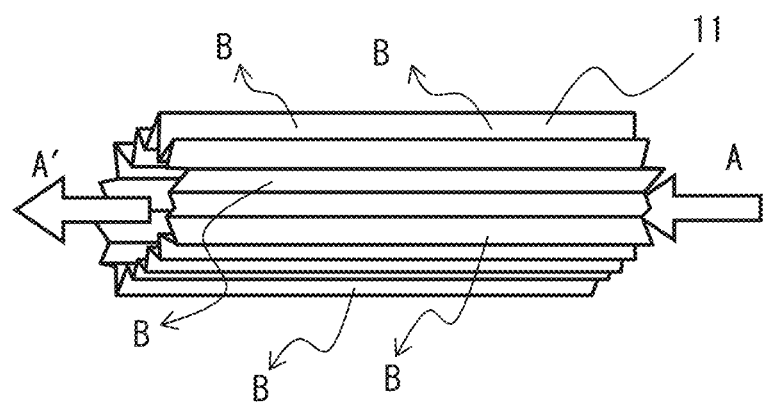
FIG. 3 is a schematic view detailing the form and function of a pleated hydrophobic porous membrane.

FIG. 3 shows an example of a pleated hydrophobic porous membrane.

The hydrophobic porous membrane (11) of FIG. 3 is formed in a tubular shape having a large number of folds (pleats), wherein, for example, a rectangular flat sheet porous membrane is alternately made into mountain folds and valley folds by means of fold lines parallel to one side of the rectangular shape, and then rolled around the direction parallel to the fold lines. The treatment target water (A) is introduced, for example, into the central cavity portion of the hydrophobic porous membrane (11), the vapor (B) separated from the treatment target water passes through the hydrophobic porous membrane (11) and diffuses to the outside, and the distilled treatment target water (A') passes through the central cavity portion of the hydrophobic porous membrane (11) and is discharged to the outside. A configuration in which the treatment target water (A) is introduced from the outside of the hydrophobic porous membrane (11), and the vapor (B) separated from treatment target water passes through the hydrophobic porous membrane (11) and diffuses into the central cavity may be adopted.

When the hydrophobic porous membrane is pleated, it is preferable that the axial direction of the membrane cartridge for membrane distillation coincide with the axial direction of the cylinder in the hydrophobic porous membrane, which has folds and which has been rolled into a cylinder.

Figure 4:
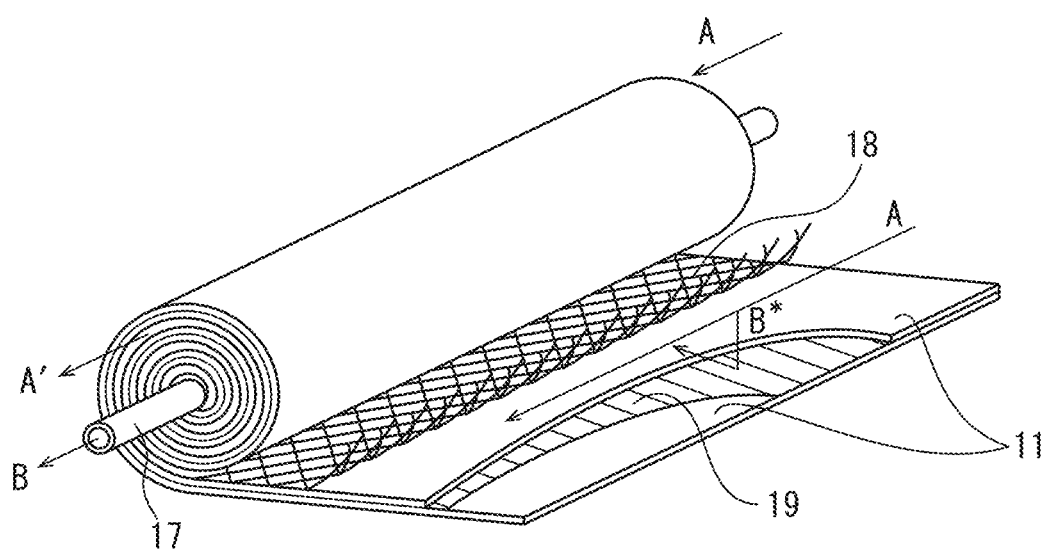
FIG. 4 is a schematic view detailing the form and function of a spiral hydrophobic porous membrane.

FIG. 4 shows an example of a spiral hydrophobic porous membrane.

FIG. 4 illustrates a configuration in which, for example, two hydrophobic porous membranes (11), along with a liquid phase unit spacer (18) and a gas phase unit spacer (19), are wound around a rod-shaped structure (17) as a winding axis in a laminate body state having a four-layer structure in which the hydrophobic porous membrane (11), the liquid phase unit spacer (18), the hydrophobic porous membrane (11), and the gas phase unit spacer (19) are laminated in this order. The treatment target water (A) is introduced into a liquid phase unit formed by, for example, the liquid phase unit spacer (18). The vapor (B) separated from the treatment target water (A) passes through the hydrophobic porous membrane (11), diffuses into a gas phase unit formed by the gas phase unit spacer (19), and is discharged to the outside through the rod-shaped structure (17). Reference sign "B*" in FIG. 4 indicates that the vapor separated from the treatment target water (A) passes through the hydrophobic porous membrane (11) and diffuses into the gas phase unit.

The rod-shaped structure (17) functions as a vapor discharge pipe which is connected to the gas phase unit of the membrane distillation module and discharges the vapor in the gas phase unit to the outside of the membrane distillation module when the membrane cartridge for membrane distillation is housed in the membrane distillation housing. Therefore, the rod-shaped structure (17) may have a structure that allows gas to pass from the side surface of the rod to the inside of the rod, for example, it may be hollow and have holes on the side wall surface, or it may be a porous structure. The rod-shaped structure (17) may protrude outward from the membrane distillation housing when the membrane cartridge for membrane distillation is housed in the membrane distillation housing.

It should be noted that the rod-shaped structure of the membrane cartridge for membrane distillation will be described in detail later.

When the hydrophobic porous membrane is a spiral membrane, it is preferable that the axial direction of the membrane cartridge for membrane distillation coincide with the direction of the winding axis of the winding body composed of the two hydrophobic porous membranes, the liquid phase unit spacer, and the gas phase unit spacer.

In the present embodiment, from the viewpoint of water permeability in membrane distillation and mechanical strength of the membrane, the membrane thickness of the hydrophobic porous membrane is preferably 10 μm to 1,000 μm, and more preferably 15 μm to 1,000 μm. When the membrane thickness is 1,000 μm or less, decreases in distilled water production efficiency can be prevented. When the membrane thickness is 10 μm or more, deformation of the membrane when used under reduced pressure can be prevented.

As described above, the hydrophobic porous membrane is hollow fiber or flat sheet, and in the membrane distillation module of the present embodiment, from the viewpoint of compactness, it is preferable to use a hollow fiber hydrophobic porous membrane which enables an increase in membrane surface area per unit volume.

When the hydrophobic porous membrane is hollow fiber, the outer diameter thereof is, for example, 0.3 mm to 5.0 mm, and preferably 0.35 mm to 4.0 mm, and the inner diameter thereof is, for example, 0.2 mm to 4.0 μm, and preferably 0.25 mm to 3.0 mm.

The porous membrane for membrane distillation according to the present embodiment contains a hydrophobic polymer as a main constituent component. Hydrophobic polymers are polymers with low affinity for water, and can include one or more resins selected from the group consisting of, for example, polysulfone, polyethersulfone, polyethylene, polypropylene, polyvinylidene fluoride, polytetrafluoroethylene, and ethylene/tetrafluoroethylene copolymers, and polychlorotrifluoroethylene. From the viewpoint of hydrophobicity, membrane-formation properties, mechanical durability, and thermal durability, polyvinylidene fluoride, ethylene/tetrafluoroethylene copolymers, and polychlorotrifluoroethylene are preferable, and it is further preferable that impurities such as plasticizers be removed by refining after the polymerization of these polymers or after membrane formation therewith.

As the method for producing the hydrophobic porous membrane, a thermally induced phase separation method, in which a resin membrane in a molten state is cooled to cause a phase separation to form a porous layer, or a dry-wet method (non-solvent induced phase separation method), in which a polymer membrane in the form of a solution is brought into contact with a non-solvent to cause a phase separation to form a porous layer, can be suitably used.

From the viewpoint of balancing the improvement of distilled water production efficiency and the suppression of salt permeation, it is preferable to apply a coating of a hydrophobic polymer to the porous membrane obtained by the thermally induced phase separation method or the non-solvent induced phase separation method. By forming a hydrophobic coating on all or part of the treatment target water side (liquid phase unit side) surface, the vapor permeation side (gas phase unit side) surface, and the inside of the membrane (wall surface in the pore) of the porous membrane, the hydrophobic polymer imparts water repellency to the membrane or improves the water repellency of the membrane. For example, when the hydrophobic porous membrane is hollow fiber, at least a part of the bore surface, the shell surface, and the pore surface in the cross section may be coated with a hydrophobic polymer to impart high water repellency.

Examples of the hydrophobic polymer with which the porous membrane is coated include:
(A) silicone-based polymers and polymer gels which form crosslinked structures by reacting with silane coupling agents;
(B) polymers having a siloxane bond, for example, a dimethyl silicone gel, a methylphenyl silicone gel, a reactive modified silicone gel in which an organic functional group such as an amino group has been introduced, or a fluoroalkyl-modified silicone gel;
(C) polymers having a (per)fluoroalkyl group, a (per) fluoropolyether group, an alkylsilyl group, or a fluorosilyl group, in the side chain dissolved in a solvent;
(D) hydrophobic polymer thin films having a fluoroalkyl group, an alkylsilyl group, or a fluorosilyl group, in the side chain; and
(E) water repellents having a fluoroalkyl group, an alkylsilyl group, or a fluorosilyl group, in the side chain.

As the hydrophobic polymer, in particular, one or more polymers selected from $C_{1-12}$ (meth)acrylate-based monomers or vinyl-based monomers having a (per)fluoroalkyl group or a (per)fluoropolyether group are preferable.

<Membrane Affixation Part>

The membrane affixation part of the membrane cartridge for membrane distillation is the portion where the hydrophobic porous membrane is affixed with an affixation resin at both ends of the axial direction of the cartridge.

It is necessary that the affixation resin which affixes the hydrophobic porous membrane have mechanical strength and heat resistance at 100° C. Examples of the resins which can be used as the affixation resin include thermosetting epoxy resins and thermosetting urethane resins. Epoxy resins are preferable from the viewpoint of heat resistance, but urethane resins are preferable from the viewpoint of handleability.

When a hollow fiber hydrophobic porous membrane is used as the hydrophobic porous membrane, the filling rate of the hollow fiber hydrophobic porous membrane, based on the cross-sectional area obtained by cutting the membrane affixation part on the plane perpendicular to the axial direction of the cartridge, is preferably 15% or more, and more preferably 20% or more from the viewpoint of miniaturization of the membrane distillation module. To uniformly affix the hollow fiber with an affixation resin, the filling rate is preferably 74% or less, and more preferably 70% or less. The filling rate (%) of the hollow fiber porous membrane is calculated by (the total cross-sectional area of the hollow fiber hydrophobic porous membrane)/(the cross-sectional area of the membrane affixation part)×100. The cross-sectional area of the hollow fiber hydrophobic porous membrane refers to the area of the portion of the hollow fibers surrounded by the outer circumference, and is a concept including the area of the bore side.

When hollow fiber hydrophobic porous membranes are used as the hydrophobic porous membranes, the hollow fiber membranes are formed into small bundles and arranged separately in the membrane affixation part as the small bundles, whereby the membrane surface area of the entire cartridge can be increased while maintaining the distance from the center of the small bundles of the membrane to the outer circumference to within a predetermined value.

Specifically, the distance between the hollow fiber membranes in the small bundles is preferably less than 3 mm, and more preferably less than 2 mm. The diameter of the small bundles is preferably less than 60 mm, and more preferably less than 50 mm. The distance between the small bundles is preferably 3 mm or more, and more preferably 4 mm or more.

Figure 5:
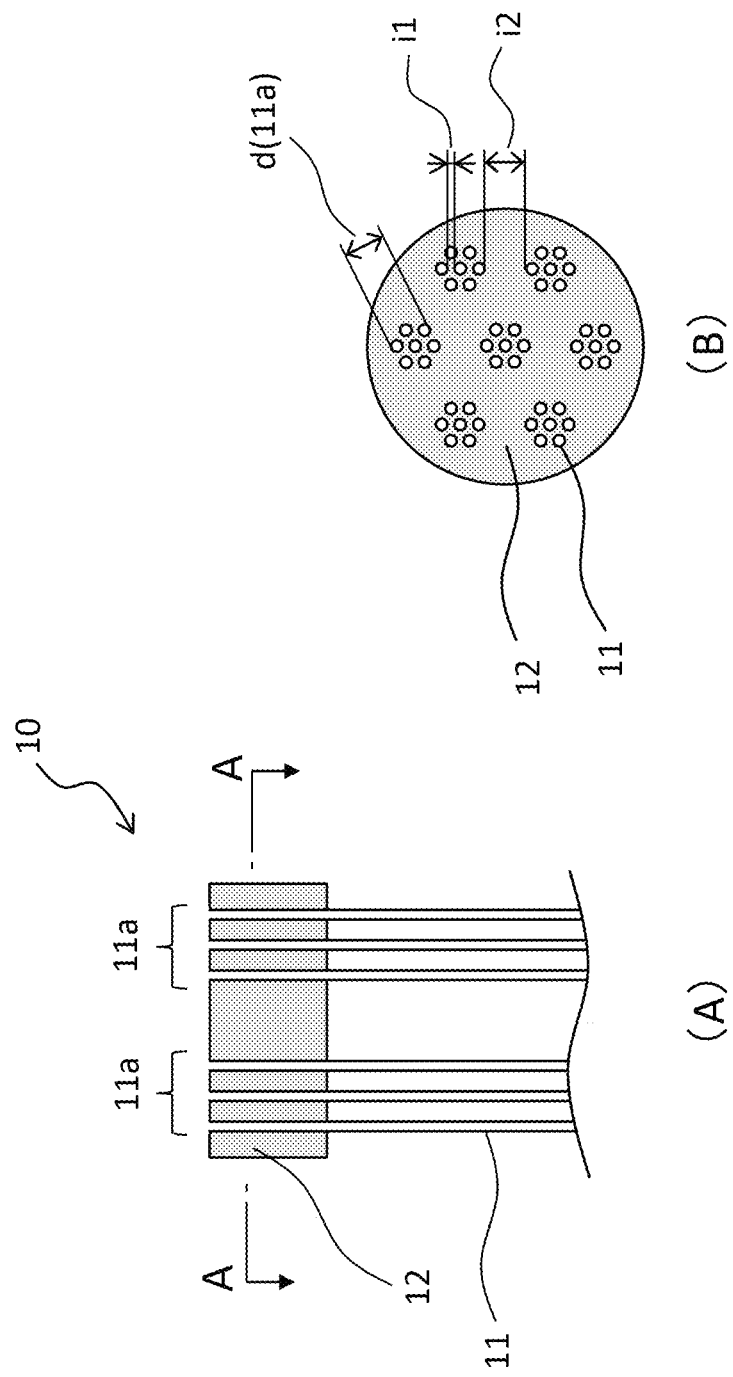
FIG. 5 is a schematic view showing an example of an aspect in which a plurality of hollow fiber hydrophobic porous membranes are divided into small bundles and arranged.

FIG. 5 shows an example of an aspect in which the plurality of hollow fiber hydrophobic porous membranes are divided into a plurality of small bundles, and the plurality of small bundles are dispersedly arranged in a cross-section of the membrane affixation part in a direction perpendicular to the axial direction of the membrane cartridge for membrane distillation. FIG. 5 (A) is a cross-sectional view in a plane parallel to the axial direction of the membrane cartridge for membrane distillation, and FIG. 5 (B) is a cross-sectional view taken along line A-A of FIG. 5(A).

The membrane cartridge for membrane distillation (10) of FIG. 5 has a membrane affixation part (12) which affixes the hydrophobic porous membranes (11) with the affixation resin at both axial direction ends thereof. With reference to FIG. 5(B), the plurality of hydrophobic porous membranes (11) are divided into seven units with seven small bundles (11a) as single units, and it is understood that they are dispersedly arranged in the cross-section of the membrane affixation part (12). In FIG. 5B, the diameter of the small bundle is the length represented by the sign "$d_{11a}$", the distance between the hollow fiber membranes in the small bundle is the length represented by the sign "i1", and the distance between the small bundles is the length represented by the sign "i2".

The effective length of hydrophobic porous membrane, which is defined as the shortest distance between two membrane affixation parts arranged at both axial direction ends of the membrane cartridge for membrane distillation, from the viewpoint of increasing the effective length ratio per full length of the porous membrane (i.e., to use the membrane more effectively), is preferably 60 mm or more, more preferably 100 mm or more, and further more preferably 200 mm or more, and in order to suppress pressure loss that occurs when the treatment target water passes through the liquid phase unit of the membrane distillation module, is preferably 2,000 mm or less, preferably 1,500 mm or less, and more preferably 1,200 mm or less.

The membrane affixation part can be formed by adhering and affixing a hydrophobic porous membrane using an affixation resin as an adhesive at both axial direction ends of the cartridge. The bonding method may be any bonding method which is known for producing membrane distillation modules.

When a hollow fiber hydrophobic porous membrane is used as the hydrophobic porous membrane, for example, a known bonding method such as centrifugal bonding or static bonding can be adopted as the bonding method.

Centrifugal bonding is a method in which the hollow fiber hydrophobic porous membranes are bundled, the ends thereof are sealed, and adhesive is poured in a state in which the hollow fibers are rotated from the central portion in the length direction to both ends to apply centrifugal force. Thereafter, by cutting the sealed parts at both ends of the hollow fiber, a membrane affixation part in which the open ends of the bundle of hollow fibers are affixed by affixation resin can be obtained.

Static bonding is a method in which the hollow fiber hydrophobic porous membranes are bundled, the ends thereof are sealed, and adhesive is poured in a state in which the sealed ends are facing downward. Thereafter, by cutting the sealed portions of the hollow fiber end portions, a membrane affixation part in which the open end portions of the hollow fiber bundles are affixed with the affixation resin can be obtained. Static adhesion may be sequentially carried out for each end of the hollow fiber.

<Regarding Compressive Stress>

Since the membrane distillation in the present embodiment operates while the gas phase unit of the hydrophobic porous membrane is set to a reduced pressure state, the compressive stress represented by the following formula in its axial direction is exerted on in the axial direction of the membrane cartridge for membrane distillation.

Compressive stress [kgf]=(cross-sectional area of membrane affixation part [cm$^2$])×{(pressure [kPa] of treatment target water in liquid phase unit)−(pressure of gas phase unit [kPa])}× 98.0665.

If the size of the membrane cartridge for membrane distillation is changed by the above-mentioned compressive stress, the sealing property between the cartridge and the housing is impaired, whereby airtightness cannot be maintained. Thus, it is necessary that the membrane cartridge for membrane distillation have pressure resistance to compressive stress. Specifically, the dimensional change in the axial direction of the cartridge before and after the application of the compressive stress is preferably less than 5%, and more preferably less than 3%.

To impart such pressure resistance to the membrane distillation membrane cartridge, for example, a method in which the rod-shaped structure, which is described later, functions as a side core rod, a method of affixing the membrane affixation part of the cartridge with the housing by screwing after inserting the membrane cartridge for membrane distillation into the membrane distillation housing, or a method of covering at least a part of the side surface of the cartridge other than the ends of the hydrophobic porous membrane and the membrane affixation part affixing the membrane with a cartridge case can be adopted. Regarding the screwing of the membrane cartridge for membrane distillation and the membrane distillation housing, they may be screwed directly between the two, or indirectly via an appropriate member arranged between the two. The cartridge case will be described later.

<Rod-Shaped Structure>

The membrane cartridge for membrane distillation may further comprise at least one rod-shaped structure which is affixed with the affixation resin at both axial direction ends of the cartridge. The rod-shaped structure, for example, reinforces the mechanical strength of the cartridge, and in particular, it may have a function as a "side core rod" which imparts resistance to compressive stress, or may have a function as a "vapor discharge rod" which induces vapor generated from treatment target water and diffused into the gas phase unit in the cartridge to the gas phase unit of the membrane distillation module and promotes discharge to the outside of the membrane distillation module.

(Side Core Rod)

As the rod-shaped structure which functions as a side core rod, for example, a solid rod or a hollow rod (pipe) made of a metal or resin may be used.

The side core rod may be arranged so as to connect between the membrane affixation parts at both ends of the membrane cartridge for membrane distillation, and can impart resistance to compressive stress to the membrane cartridge for membrane distillation.

The length of the side core rod may be, for example, longer than the effective length of the hydrophobic porous membrane and shorter than the full length of the hydrophobic porous membrane.

The number of side core rods may be one or more, preferably 1 to 12, and more preferably 2 to 6.

(Vapor Discharge Rod)

When the diameter of the membrane cartridge for membrane distillation becomes large, there is a risk that the amount of vapor generated in the center of the membrane bundle decreases due to pressure loss from the center of the membrane bundle toward the outer circumference. Therefore, when a rod-shaped structure that functions as a vapor discharge rod is arranged in the center of the membrane bundle, a vapor path is created from the center of the membrane bundle to the outside of the cartridge, whereby the entire membrane bundle can be used uniformly.

The rod-shaped structure as a vapor discharge rod may be, for example, a hollow structure having holes on the side surfaces thereof, or a porous structure. In the membrane distillation module, the hollow interior of the rod-shaped structure can be connected to the gas phase unit of the membrane distillation module, and the rod-shaped structure, which is hollow and has holes on the sides thereof, functions as a vapor discharge rod. The rod-shaped structure, which is a porous structure, functions as a vapor discharge rod because the pores of the rod-shaped structure can be connected to the gas phase unit of the membrane distillation module in the membrane distillation module.

The porous structure may be, for example, a sponge or a mesh. The porous structure preferably has a large porosity so as not to cause resistance when vapor passes therethrough. Specifically, the porosity is preferably 50% by volume or more, and more preferably 70% by volume or more.

The number of vapor discharge rods may be one or more, preferably one to six, and more preferably one to three.

<Net and Non-Woven Fabric>

At least a part of the membrane cartridge for membrane distillation other than the axial direction ends thereof may be covered with at least one of a net and a non-woven fabric.

(Net)

In order to prevent sagging of the hydrophobic porous membrane during high-temperature operation and damage to the hydrophobic porous membrane due to contact during transportation, all or a part of the outer circumference of the membrane cartridge for membrane distillation may be covered with a net.

The material of the net is not particularly limited, and can be, for example, a resin or metal. The net may be composed of a single material or a combination of different materials.

Examples of the resin constituting the net include polysulfone, polyethersulfone, polyacrylonitrile, polyimide, polyetherimide, polyamide, polyetherketone, polyetheretherketone, polyphenylene sulfide, polyethylene, polypropylene, poly(4-methylpentene), ethylene-vinyl alcohol copolymers, ethylene vinyl acetate, nylon, polyester, polyvinylidene chloride-vinyl chloride copolymers, polyvinylidene chloride-acrylonitrile copolymers, cellulose, cellulose acetate, polyvinylidene fluoride, ethylene-tetrafluoroethylene copolymers, polytetrafluoroethylene, and tetrafluoroethylene/perfluoroalkyl vinyl ether copolymers. Composite materials thereof may be used. In consideration of mountability to the hydrophobic porous membrane, the resin constituting the net is preferably polyamide, polyethylene, polypropylene, polyvinylidene fluoride, an ethylene-tetrafluoroethylene copolymer, polytetrafluoroethylene, or a tetrafluoroethylene/perfluoroalkyl vinyl ether copolymer.

As the metal constituting the net, a general metal which can be processed into a mesh can be used, and examples thereof include iron, copper, brass, titanium, nickel, platinum, pure silver, molybdenum, tungsten, aluminum, zinc, and tantalum, and alloys containing two or more of these. The metal constituting the net preferably contains at least one selected from the group consisting of stainless steel, aluminum, iron, and titanium from the viewpoint of ease of processing.

(Non-Woven Fabric)

In order to prevent leaked treatment target water from directly mixing into the distilled water of the product when the treatment target water leaks to the vapor permeation surface side (gas phase unit side) of the hydrophobic porous membrane due to wetting, all or a part of the outer circumference of the membrane cartridge for membrane distillation may be covered with a non-woven fabric.

The material of the non-woven fabric is not particularly limited. The non-woven fabric may be composed of a single material or a combination of different materials.

Examples of the material of the non-woven fabric include polysulfone, polyethersulfone, polyacrylonitrile, polyimide, polyetherimide, polyamide, polyetherketone, polyetheretherketone, polyphenylene sulfide, polyethylene, polypropylene, poly(4-methylpentene), ethylene-vinyl alcohol copolymers, ethylene vinyl acetate, nylon, polyester, polyvinylidene chloride-vinyl chloride copolymers, polyvinylidene chloride-acrylonitrile copolymers, cellulose, cellulose acetate, polyvinylidene fluoride, ethylene-tetrafluoroethylene copolymers, polytetrafluoroethylene, and tetrafluoroethylene/perfluoroalkyl vinyl ether copolymers. Composite materials thereof may be used. In consideration of mountability to the hollow fiber membrane bundle and heat resistance, the material of the non-woven fabric is preferably polyamide, polyethylene, polypropylene, polyvinylidene fluoride, an ethylene-tetrafluoroethylene copolymer, polytetrafluoroethylene, or a tetrafluoroethylene/perfluoroalkyl vinyl ether copolymer.

The non-woven fabric preferably has sufficient air permeability so as not to resist vapor permeation. Specifically, the air permeability of the non-woven fabric is preferably 0.5 mL/cm²·sec or more, and more preferably 2.0 mL/cm²·sec or more.

<Cartridge Case>

As described above, since the membrane distillation in the present embodiment operates while the gas phase unit of the hydrophobic porous membrane is set to a reduced pressure state, the compressive stress is exerted on in the axial direction of the membrane cartridge for membrane distillation. In order to suppress dimensional changes of the membrane cartridge for membrane distillation due to this compressive stress, in the membrane cartridge for membrane distillation, a portion other than both axial direction ends may be covered with a cartridge case.

The cartridge case may have a cartridge case aperture unit having a sufficient aperture area so as not to obstruct the flow of vapor generated from treatment target water. The aperture area of the cartridge case aperture unit is preferably 1/250 or more, and more preferably 1/200 or more, of the membrane surface area of the hydrophobic porous membrane of the membrane cartridge for membrane distillation.

The cartridge case is preferably affixed by being directly adhered to the membrane affixation part. In this case, in order to prevent peeling of the adhesive part between the cartridge case and the membrane affixation part as a result of dimensional changes due to temperature changes, the ratio ($k_C/k_F$) of the coefficient of linear expansion ($k_C$) of the material constituting the cartridge case to the coefficient of linear expansion ($k_F$) of the affixation resin is preferably 0.3 to less than 4.0, and more preferably 0.3 to less than 2.0.

The material of the cartridge case is preferably selected from resins such as, for example, epoxy resins, polypropylene, polysulfone, polyethersulfone, polyvinylidene fluoride, polyphenylene ether, ABS resins, fiber-reinforced plastics, and vinyl chloride resins.

The cartridge case may be divided into two or more parts.

Specific Example of Membrane Cartridge for Membrane Distillation

The specific aspects of the membrane cartridge for membrane distillation will be described below while referring to the drawings.

For examples of the case in which the hydrophobic porous membrane are hollow fiber, a plurality of hollow fiber hydrophobic porous membranes are bundled together, and the membrane cartridge for membrane distillation has a substantially columnar shape, refer to the schematic cross-sectional views of the embodiments shown in FIGS. 6 to 11.

Figure 6:
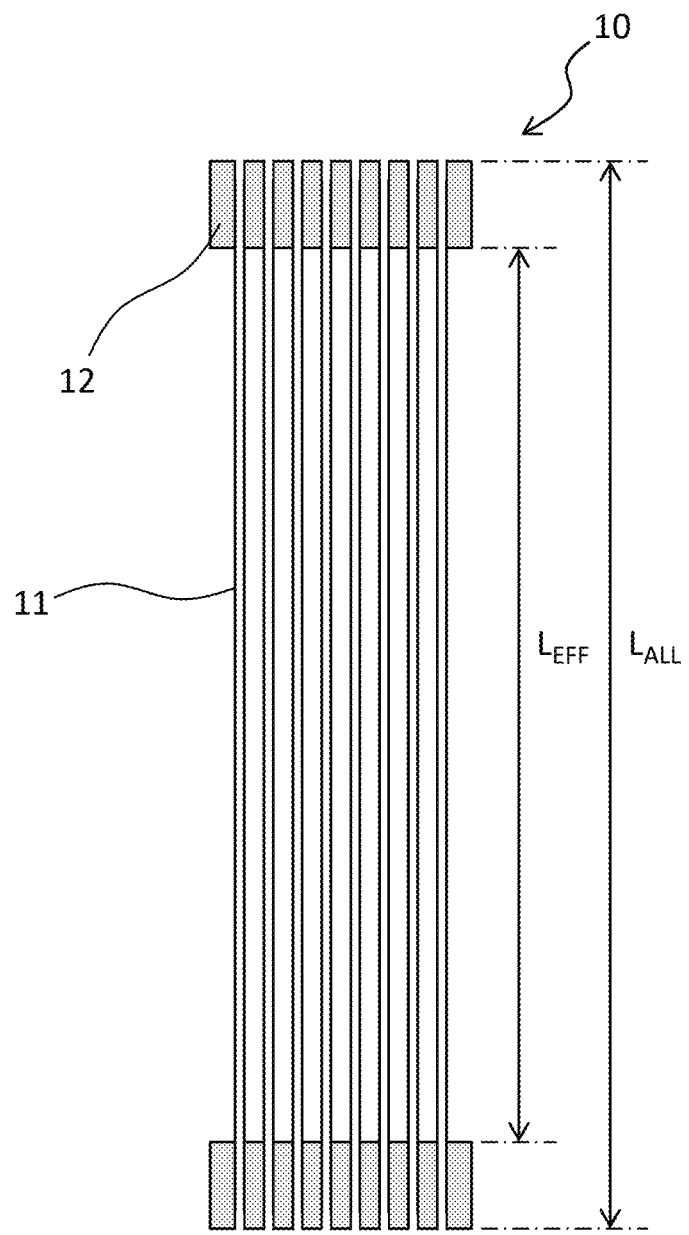
FIG. 6 is a schematic cross-sectional view showing the structure of an example of a membrane cartridge for membrane distillation of the present invention.

The membrane cartridge for membrane distillation (10) of FIG. 6 comprises, on both axial direction ends thereof, a membrane affixation part (12) in which the hollow fiber hydrophobic porous membrane (11) is affixed with the affixation resin. The full length of the hollow fiber hydrophobic porous membrane (11) is the length represented by "$L_{ALL}$" in the membrane cartridge for membrane distillation (10), the effective length is defined as the shortest distance between two membrane affixation parts arranged at both ends of the axial direction of the membrane cartridge for membrane distillation, and is a length represented by the sign "$L_{EFF}$."

Figure 7:
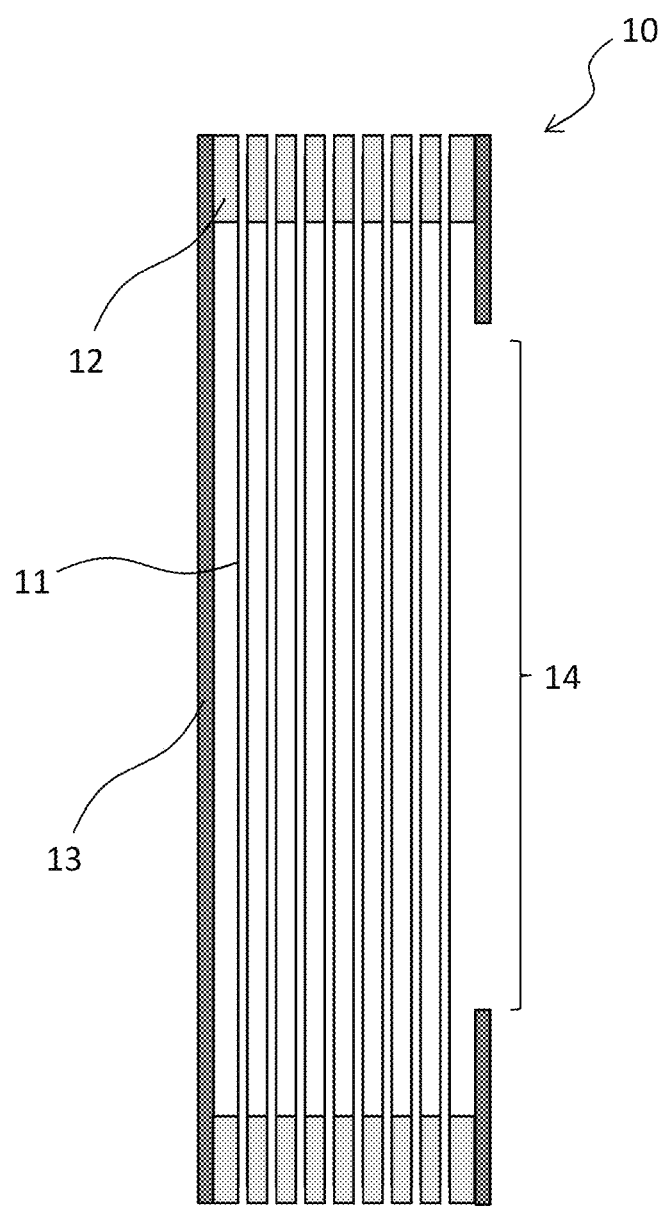
FIG. 7 is a schematic cross-sectional view showing the structure of another example of a membrane cartridge for membrane distillation of the present invention.

The membrane cartridge for membrane distillation (10) of FIG. 7 is schematically identical to the membrane cartridge for membrane distillation of FIG. 6 except that the portions other than the axial direction ends thereof are covered with the cartridge case (13). The membrane cartridge for membrane distillation (10) of FIG. 7 has a cartridge case aperture unit (14), although substantially the entire side surface other than the axial direction ends are covered with the cartridge case (13).

The membrane cartridge for membrane distillation (10) of FIG. 7 is covered with a cartridge case (13) having a cartridge case aperture unit (14), whereby it has high resistance to compressive stress during distillation operation, but the flow of vapor generated from treatment target water inside the cartridge is not blocked.

Figure 8:
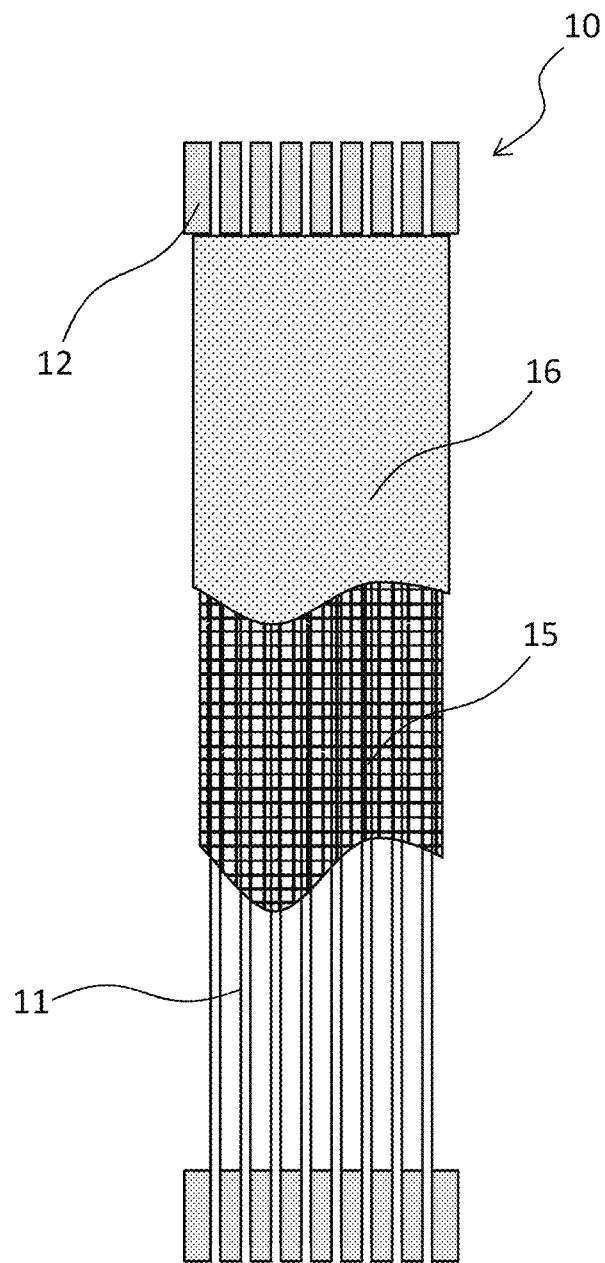
FIG. 8 is a schematic cross-sectional view showing the structure of yet another example of a membrane cartridge for membrane distillation of the present invention.

The membrane cartridge for membrane distillation (10) of FIG. 8 is schematically identical to the membrane cartridge for membrane distillation of FIG. 6 except that substantially the entire surface thereof excluding the axial direction ends is covered with a net (15) and a non-woven fabric (16) in this order. Though the net (15) and non-woven fabric (16) at the bottom of the drawing have been illustrated in FIG. 8 with some parts removed in order to facilitate understanding the structure of the membrane cartridge for membrane distillation, it may be considered that the entire side surface of this cartridge is covered with the net (15) and the non-woven fabric (16). Since the membrane cartridge for membrane distillation (10) of FIG. 8 is covered with the net (15) and the non-woven fabric (16), sagging of the hydrophobic porous membrane during high-temperature operation and damage to the hydrophobic porous membrane due to contact during transportation are prevented, and further, even when treatment target water leaks to the gas phase unit side of the hydrophobic porous membrane, the leaked treatment target water is prevented from being mixed into the distilled water.

Figure 9:
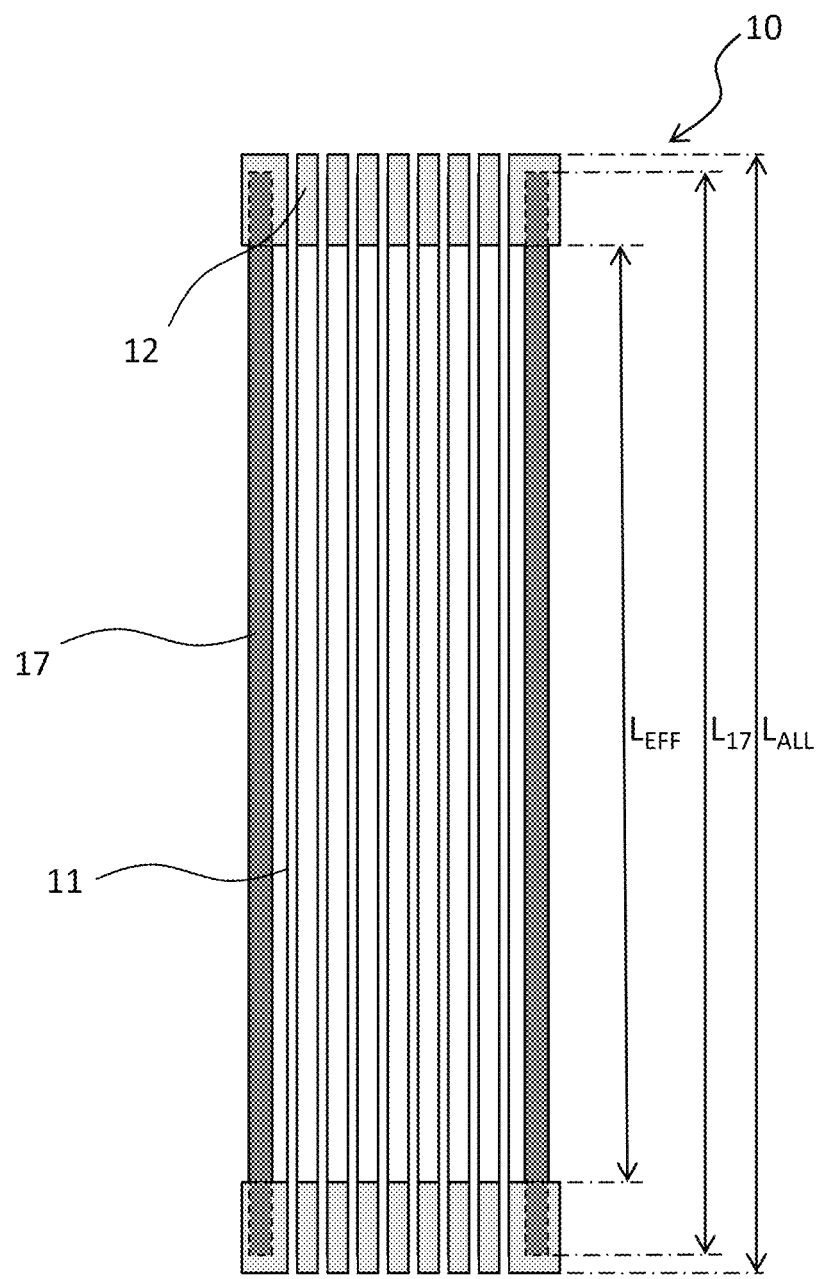
FIG. 9 is a schematic cross-sectional view showing the structure of yet another example of a membrane cartridge for membrane distillation of the present invention.

The membrane cartridge for membrane distillation (10) of FIG. 9 is schematically identical to the membrane cartridge for membrane distillation of FIG. 6 except that it has a rod-shaped structure (17) which is affixed with the affixation resin at both axial direction ends thereof. The rod-shaped structure (17) of FIG. 9 may function as a side core rod, and may be a solid rod or a hollow rod (pipe). The length ($L_{17}$) of the rod-shaped structure (17) functioning as a side core rod may be longer than, for example, the effective length ($L_{EFF}$) of the hydrophobic porous membrane and shorter than the full length ($L_{ALL}$) of the hydrophobic porous membrane. It is preferable that two or more, more preferably two to eight, and further preferably two to six, rod-shaped structures (17) functioning as side core rods be substantially evenly arranged on the outside of the hydrophobic porous membrane near the outer circumference of the cross section of the membrane affixation part (12).

The membrane cartridge for membrane distillation (10) of FIG. 9 has a rod-shaped structure (17) which functions as a side core rod, and thus, has high resistance to compressive stress during distillation operation.

Figure 10:
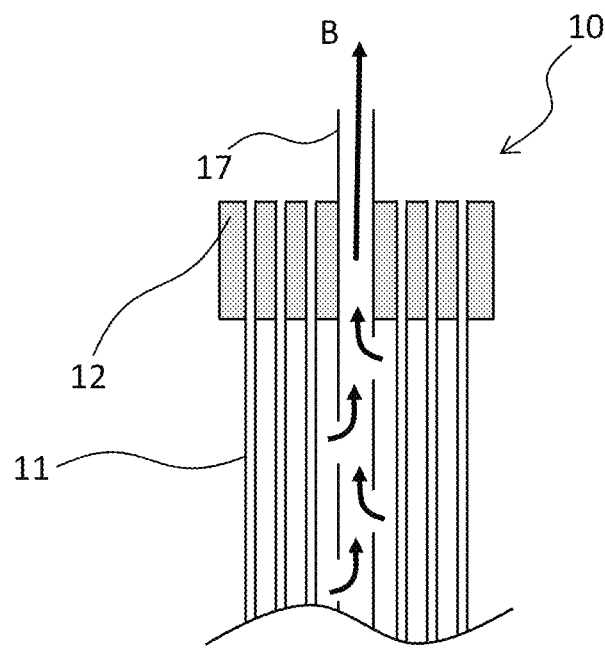
FIG. 10 is a schematic cross-sectional view detailing an example of a rod-shaped structure optionally included in the membrane cartridge for membrane distillation of the present invention.
Figure 11:
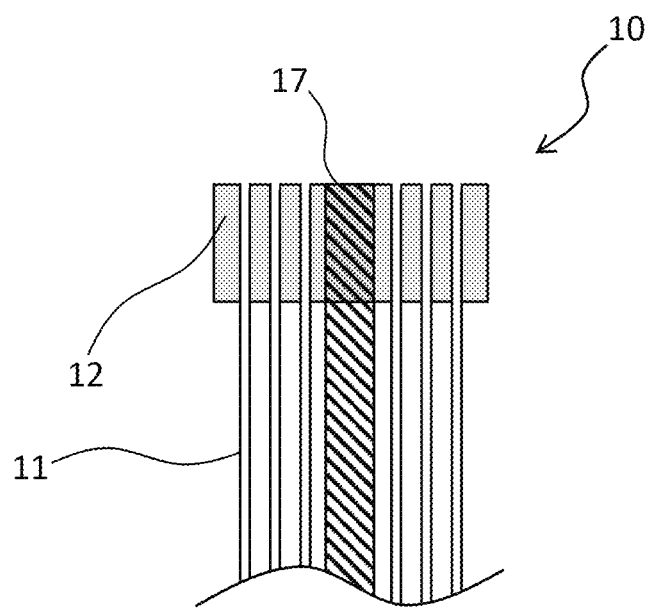
FIG. 11 is a schematic cross-sectional view detailing another example of a rod-shaped structure optionally included in the membrane cartridge for membrane distillation of the present invention.

The membrane cartridges for membrane distillation of FIGS. 10 and 11 are schematically identical to the membrane cartridge for membrane distillation of FIG. 6 except that they have a rod-shaped structure (17) affixed with the affixation resins at on the axial direction ends thereof. The rod-shaped structure (17) of the membrane cartridge for membrane distillation (10) of FIG. 10 has a pipe shape with holes on the side surfaces thereof, the hollow interior can connect to the gas phase unit of the membrane distillation module, and the rod-shaped structure (17) functions as a vapor discharge rod. The rod-shaped structure (17) of FIG. 10 is arranged substantially in the center of bundles of hollow fiber hydrophobic porous membranes (11), and the end portion thereof protrudes from the end portion of the membrane affixation part (12). However, the end of the rod-shaped structure (17) need not protrude from the end of the membrane affixation part (12).

The rod-shaped structure (17) of the membrane cartridge for membrane distillation (10) of FIG. 11 is a porous structure, the pores thereof can connect to the gas phase unit of the membrane distillation module, and the rod-shaped structure (17) functions as a vapor discharge rod. The rod-shaped structure (17) of FIG. 11 is arranged substantially in the center of bundles of hollow fiber hydrophobic porous membranes (11), and the ends thereof are substantially coplanar with the end of the membrane affixation part (12). However, the end of the rod-shaped structure (17) may protrude from the end of the membrane affixation part (12).

The membrane cartridges for membrane distillation of FIGS. 10 and 11 have a rod-shaped structure (17) which functions as a vapor discharge rod, and as a result, even when the diameter of the membrane distillation membrane cartridge is large, the decrease in the amount of vapor generated in the center of the membrane bundles due to pressure loss is alleviated, whereby the entire membrane bundles can be used uniformly.

<<Membrane Distillation Housing>>

The membrane distillation housing according to the present embodiment has a housing body for housing the membrane cartridge for membrane distillation and one or two housing lids attached to the housing body.

The membrane distillation housing of the present embodiment may have a structure which is divided into the liquid phase unit which circulates the treatment target liquid and the gas phase unit which diffuses the vapor generated from treatment target liquid, when the membrane cartridge for membrane distillation is housed therein and used as a membrane distillation module.

<Housing Body>

The housing body of the membrane distillation housing of the present embodiment has a shape capable of housing the membrane cartridge for membrane distillation. Thus, the housing body typically has a shape similar to that of the membrane cartridge for membrane distillation (for example, substantially cylindrical or substantially polygonal), and may have an axis in the same direction as the axis of the membrane cartridge for membrane distillation, but is not limited thereto.

In the present embodiment, a total of two housing lids can be attached to each of the substantially cylindrical or substantially polygonal columnar housing bodies, one at each end of the axial direction, and the membrane cartridge for membrane distillation may be inserted and removed from either axial direction end of the housing body, or one housing lid can be attached to one axial direction end of the housing body, and the membrane cartridge for membrane distillation may be inserted and removed from only one end.

The housing body of the membrane distillation housing of the present embodiment may have a vapor outlet on a side surface thereof. When the membrane cartridge for membrane distillation is housed to form a membrane distillation module, it is preferable that the vapor outlet connects to the gas phase unit of the membrane distillation module. In this case, the vapor of the gas phase unit can be discharged from the membrane distillation module from the vapor outlet. The vapor discharged from the membrane distillation module may be condensed and recovered by, for example, a vapor condensation unit, which is described later.

In order to prevent pressure loss due to an increase in vapor flow rate at high temperature and under reduced pressure, the vapor outlet preferably has an area sufficient to maintain the vapor flow rate below a certain value. From this viewpoint, the area of the vapor outlet of the housing body is preferably 1/250 or more, and more preferably 1/200 or more, of the membrane surface area of the hydrophobic porous membrane included in the membrane cartridge for membrane distillation. When the housing body has a plurality of vapor outlets, the area of the vapor outlets is evaluated as the total area of all apertures. The upper limit of the area of the vapor outlet of the housing body may be appropriately set by a person skilled in the art as long as the mechanical strength of the housing body is not impaired thereby.

The housing body of the membrane distillation housing of the present embodiment may comprise, in the interior thereof, a cooler which is connected to the gas phase unit of the membrane distillation module for condensing the vapor in the gas phase unit. When the housing body comprises a cooler, plumbing from the membrane distillation module to the condense part outside the membrane distillation housing can be omitted, whereby the condensation of vapor can be efficiently carried out.

The cooler can have a structure generally used in conventional condensation devices. The cooler may be, for example, a shell and tube heat exchanger or a plate heat exchanger. Shell and tube heat exchangers have a structure in which a plurality of plumbing systems are arranged in parallel, and the vapor can be condensed on the outer surface of the plumbing by passing a refrigerant through the plumbing. When a shell and tube heat exchanger is used, the longitudinal direction of plumbing is preferably arranged so as to be parallel or orthogonal to the longitudinal direction of the membrane cartridge for membrane distillation from the viewpoint of efficiency of vapor condensation and compactness of the membrane distillation module. Plate heat exchangers can condense vapor on the surface of a plate on the vapor side, due to a laminate of a plurality of plates, by alternately passing refrigerant and vapor through the gaps thereof. The plate may have a flat plate shape or a corrugated plate shape.

When the housing body has a cooler, the minimum area of the vapor passage from the planned mounting location of the membrane cartridge for membrane distillation to the cooler is preferably 1/250 or more of the membrane surface area of the hydrophobic porous membrane included in the membrane cartridge for membrane distillation. If the minimum area of the vapor passage is 1/250 or more of the membrane surface area of the hydrophobic porous membrane, the flow velocity from the membrane cartridge for membrane distillation to the cooler described above is prevented from becoming excessively high, and the condensation of vapor can be efficiently carried out. The minimum area of the vapor passage is more preferably 1/200 or more of the membrane surface area of the hydrophobic porous membrane included in the membrane cartridge for membrane distillation.

When the housing body of the membrane distillation housing comprises a cooler, the housing body may have a distilled water outlet for extracting the distilled water, which is vapor that has been condensed by the cooler. In the embodiment in which the housing body has a distilled water outlet, the housing body may have an exhaust port for decompressing the gas phase unit of the housing body, or the distilled water outlet may also have the function of an exhaust port.

The material constituting the housing body is appropriately selected from the viewpoints of pressure resistance, heat resistance, impact resistance, and weather resistance. For example, a resin or metal can be used as the material constituting the housing body, and the material, from the viewpoints described above, is preferably selected from, for example, resins such as polypropylene, polysulfone, polyethersulfone, polyvinylidene fluoride, polyphenylene ether, ABS resins, fiber reinforced plastics, and vinyl chloride resins, and metals such as stainless steel, brass, aluminum brass, and titanium.

The housing body may have a single layer structure composed of a solid material or may have a multilayer structure (for example, a three-layer body comprising a metal layer, an air layer, and a metal layer) with air or another suitable heat-insulating material interposed therebetween. When the housing body is a multilayer body, the layers may be composed of the same type of material or may be composed of different materials.

When the housing body has a cooler in the interior thereof, the material of the cooler is preferably a material having high thermal conductivity from the viewpoint of increasing heat exchange efficiency between the vapor and the refrigerant, and it is preferable that a metal be used. Examples of the metal used as the material of the cooler include stainless steel, brass, aluminum brass, and titanium.

The material of the housing body and the material of the cooler may be the same or may be different.

In order to prevent leaked treatment target water from directly mixing with distilled water when the treatment target water leaks to the gas phase side of the hydrophobic porous membrane due to wetting, the housing body may have a demister.

When the housing body does not have a cooler and has vapor outlets, a demister may be installed in all or some of the vapor outlets. Conversely, when the housing body has a cooler in the interior thereof, a demister may be installed in all or some of the vapor passages from the planned mounting location of the membrane cartridge for membrane distillation to the cooler.

Since the demister comes into direct contact with the vapor that has permeated the hydrophobic porous membrane, the constituent material thereof is selected from the viewpoints of heat resistance and weather resistance. For example, a resin or metal can be used as the material constituting the demister, and from the viewpoints described above, the material is preferably selected from resins such as polypropylene, polysulfone, polyethersulfone, polyvinylidene fluoride, polyphenylene ether, ABS resins, fiber reinforced plastics, and vinyl chloride resins and metals such as stainless steel, brass, and titanium.

The demister preferably has a high porosity so as not to impede permeating vapor. Specifically, the porosity of demister is preferably 50% by volume or more, and more preferably 70% by volume or more. The porosity of the demister may be less than 100% by volume, 98% by volume or less, 95% by volume or less, or 90% by volume or less.

The housing body may have a heat insulation layer on the outer circumference thereof in order to prevent the generated vapor from condensing on the outer wall of the housing. The heat insulation layer can be, for example, a structure such as glass wool or sponge, or may be a jacket structure.

<Housing Lid>

The housing lid in the membrane distillation housing of the present embodiment is attached to the housing body after the membrane cartridge for membrane distillation is housed therein, and constitutes the membrane distillation module together with the sealing member.

When assembled as a membrane distillation module, the interior of the housing lid may be configured so as to connect to, for example, the liquid phase unit of the hydrophobic porous membrane, and the treatment target water can be circulated in the liquid phase unit of the hydrophobic porous membrane via the interior of the housing lid. Thus, the housing lid may have a lid aperture for circulation of the treatment target water which opens from the inside to the outside of the housing lid.

The housing lid may be composed of a material appropriately selected from the material group exemplified above as the material constituting the housing body. The material constituting the housing lid may be the same as or different from the material constituting the housing body. However, it is preferable that the housing lid be made of the same material as the housing body in order to prevent the occurrence of leakage due to differences in the coefficient of linear expansion at the high-temperature of the membrane distillation operation.

Specific Example of Membrane Distillation Housing

Specific aspects of the membrane distillation housing will be described below while referring to the drawings.

For examples of the case in which the membrane distillation housing has a substantially columnar shape, refer to the schematic cross-sectional views of the embodiments shown in FIGS. 12 to 17.

Figure 12:
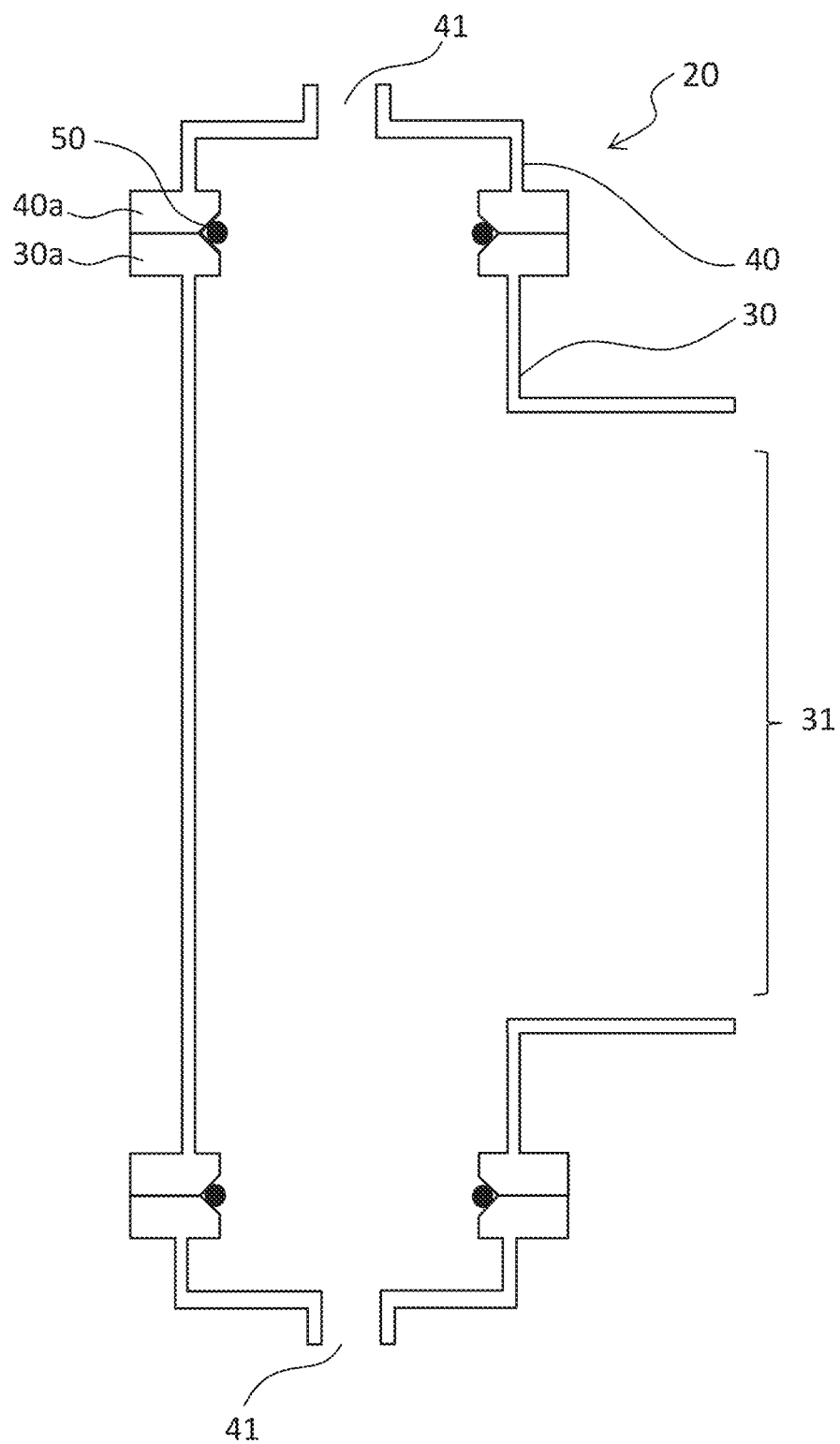
FIG. 12 is a schematic cross-sectional view detailing the structure of an example of a membrane distillation housing of the present invention.

The membrane distillation housing (20) of FIG. 12 comprises a housing body (30) and two housing lids (40) arranged on the axial direction ends of the housing body (30). In FIG. 12, a sealing member (50) is also shown. The sealing member (50) may have an O-ring, for example, but is drawn as a black solid circle in the cross-sectional view of FIG. 12.

The housing body (30) of the membrane distillation housing (20) of FIG. 12 has a vapor outlet (31) which opens on the side surface thereof.

The two housing lids (40) of the membrane distillation housing (20) of FIG. 12 each have a lid aperture (41) for circulation of the treatment target water which opens from the inside to the outside of the housing lid. The lid aperture (41) for the circulation of the treatment target water is connected to the liquid phase unit of the membrane distillation module (for example, the hollow part of the hollow fiber hydrophobic porous membrane) when formed into a membrane distillation module, and has a function to circulate the treatment target water in the liquid phase unit of the membrane distillation module.

The housing body (30) and the housing lid (40) may be affixed by, for example, a housing body flange (30a) of the housing body (30) and the housing lid flange (40a) of the housing lid (40). At this time, an appropriate sealing material may be interposed between the housing body flange (30a) and the housing lid flange (40a).

The housing body flange (30a) and the housing lid flange (40a) may have a notch at the inner end of the contact portion to facilitate the installation of the sealing member (50). This notch is not an indispensable requirement.

Figure 13:
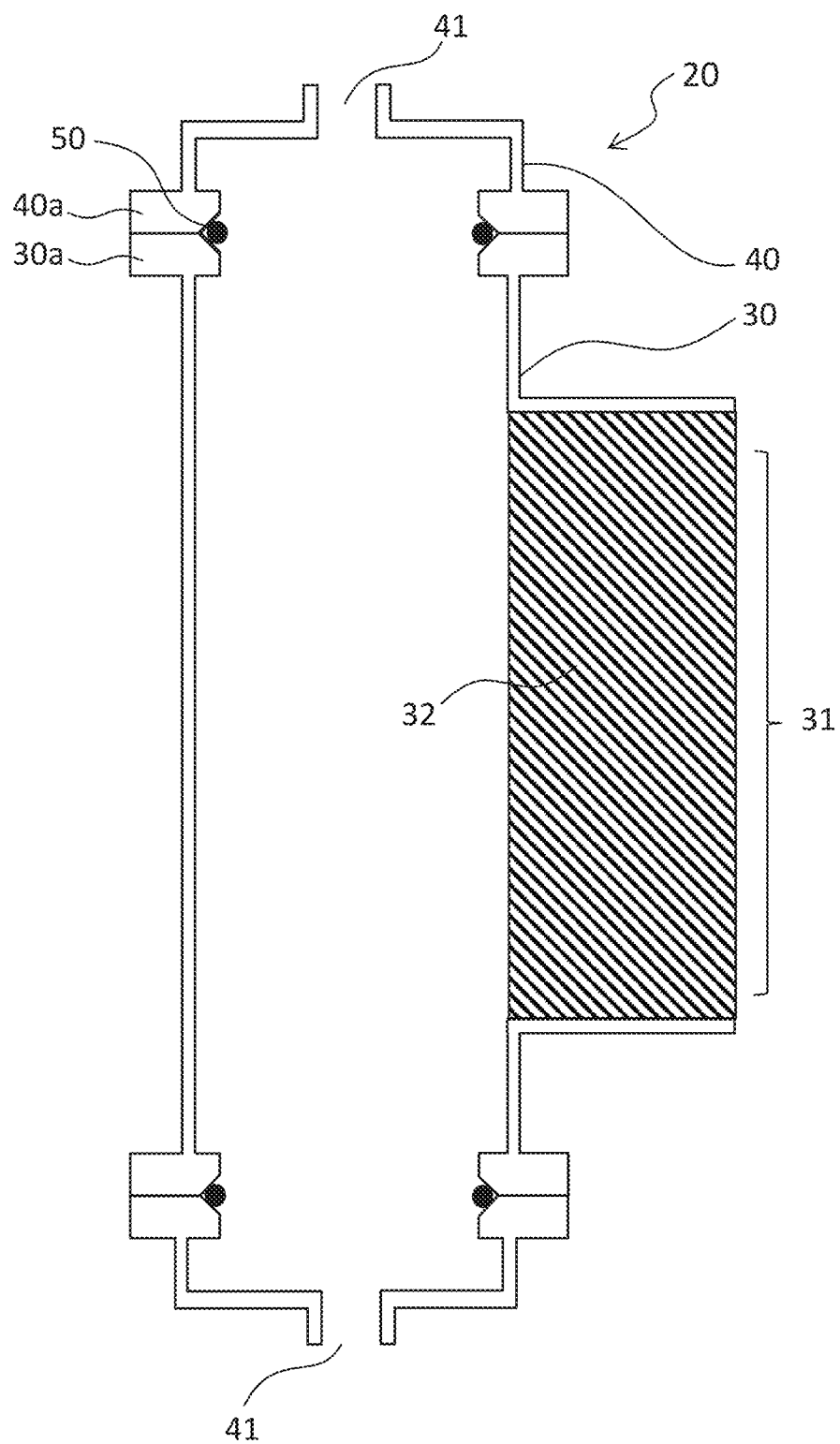
FIG. 13 is a schematic cross-sectional view detailing the structure of another example of a membrane distillation housing of the present invention.

The membrane distillation housing (20) of FIG. 13 is identical to the membrane distillation housing of FIG. 12 except that a demister (32) is arranged in the vapor outlet (31) opening on the side surface of the housing body (30).

Since the membrane distillation housing (20) in FIG. 13 has a demister (32) arranged at the vapor outlet (31) of the housing body (30), even if the treatment target water leaks to the gas phase side due to the wetting of the hydrophobic porous membrane, the leaked treatment target water is prevented from mixing with the distilled water.

Figure 14:
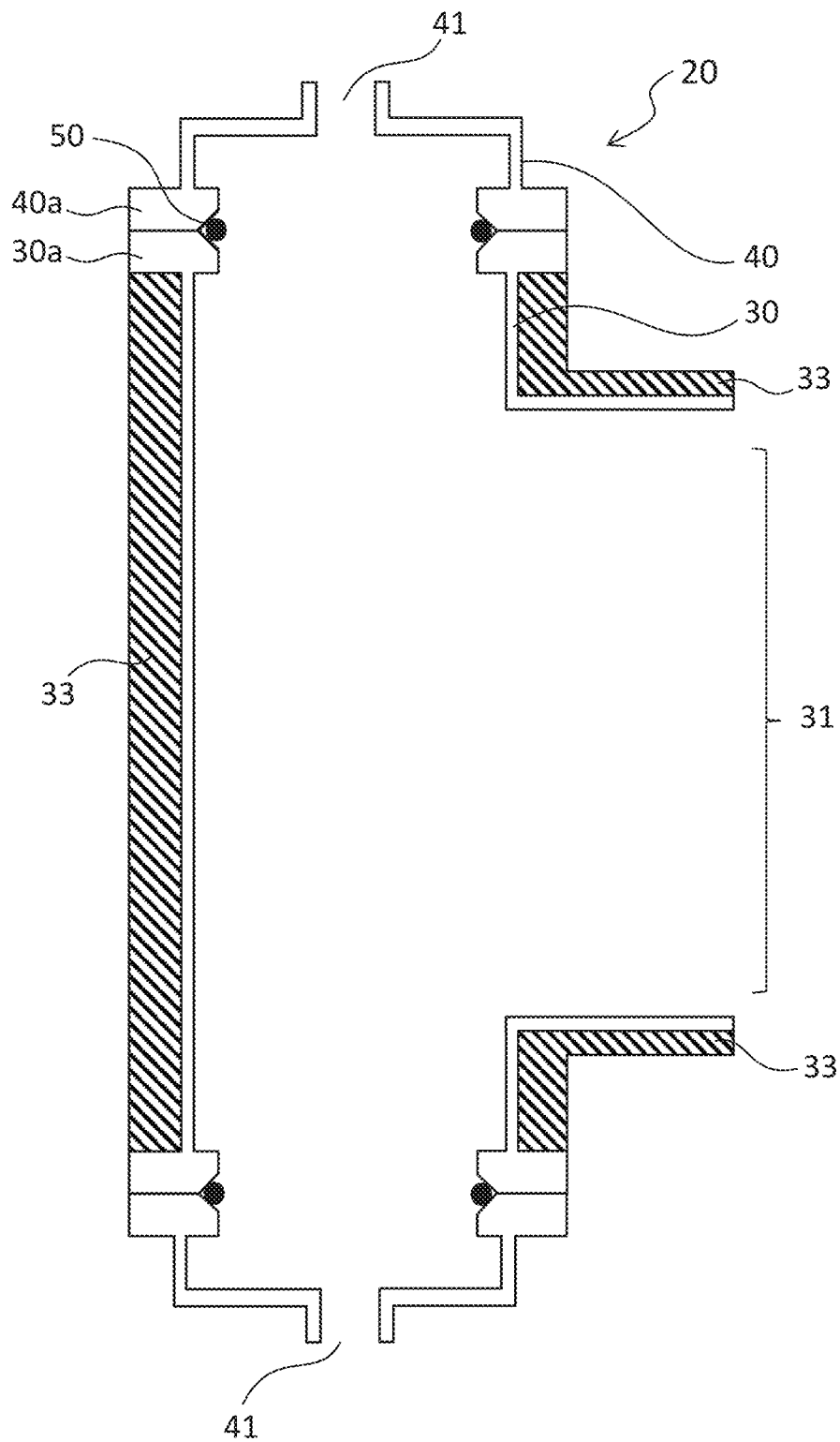
FIG. 14 is a schematic cross-sectional view detailing the structure of yet another example of a membrane distillation housing of the present invention.

The membrane distillation housing (20) of FIG. 14 is identical to the membrane distillation housing of FIG. 12 except that a heat insulation layer (33) is arranged on the side surface of the housing body (30).

Since the membrane distillation housing (20) of FIG. 14 has a heat insulation layer (33) on the side surface of the housing body (30), the vapor generated from the treatment target water is prevented from condensing on the outer wall of the membrane distillation housing, and the generated vapor can be efficiently discharged from the membrane distillation housing.

Figure 15:
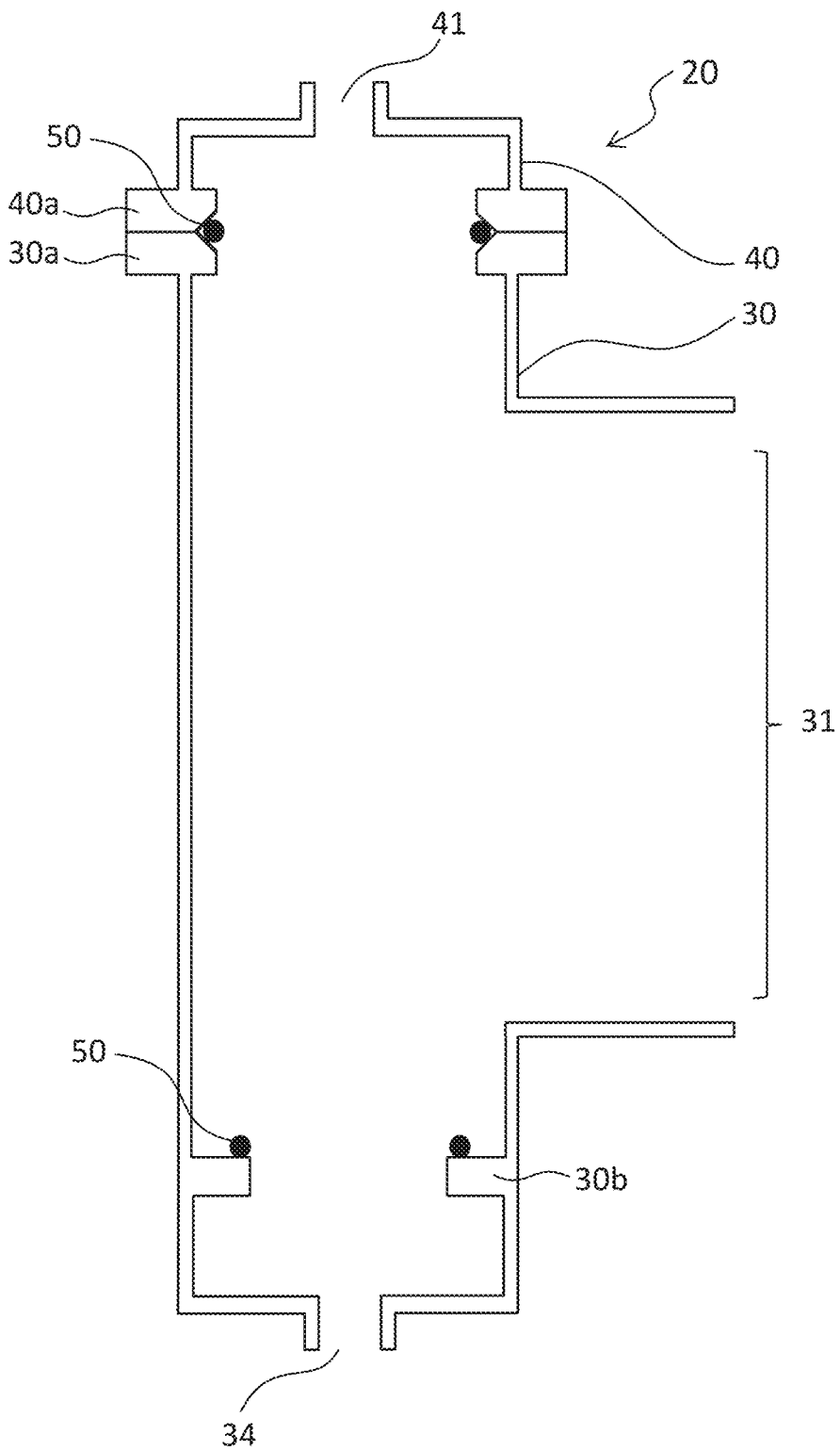
FIG. 15 is a schematic cross-sectional view detailing the structure of yet another example of a membrane distillation housing of the present invention.

The membrane distillation housing (20) of FIG. 15 has a housing body for housing the membrane cartridge for membrane distillation and one housing lid (40) attached to the housing body. In the membrane distillation housing (20) of FIG. 15, the structure of the portion in which the membrane cartridge for membrane distillation is housed and the membrane distillation housing (20) on the side where the housing lid (40) is attached are identical to those of the membrane distillation housing of FIG. 12.

However, in the membrane distillation housing (20) of FIG. 15, the housing body (30) has a housing body chin (30b) on the end of the side where the housing lid is not attached to support the membrane cartridge for membrane distillation via the sealing member (50), and instead of a lid aperture for circulation of the treatment target water, it has a housing body aperture (34) for circulating the treatment target water by introducing treatment target water into the liquid phase unit of the membrane distillation module. The housing body chin (30b) is a convex portion protruding inward from the inner wall of the housing body (30), and it may protrude so as to surround the inner wall, or may intermittently protrude on an orbit surrounding the inner wall.

Figure 16:
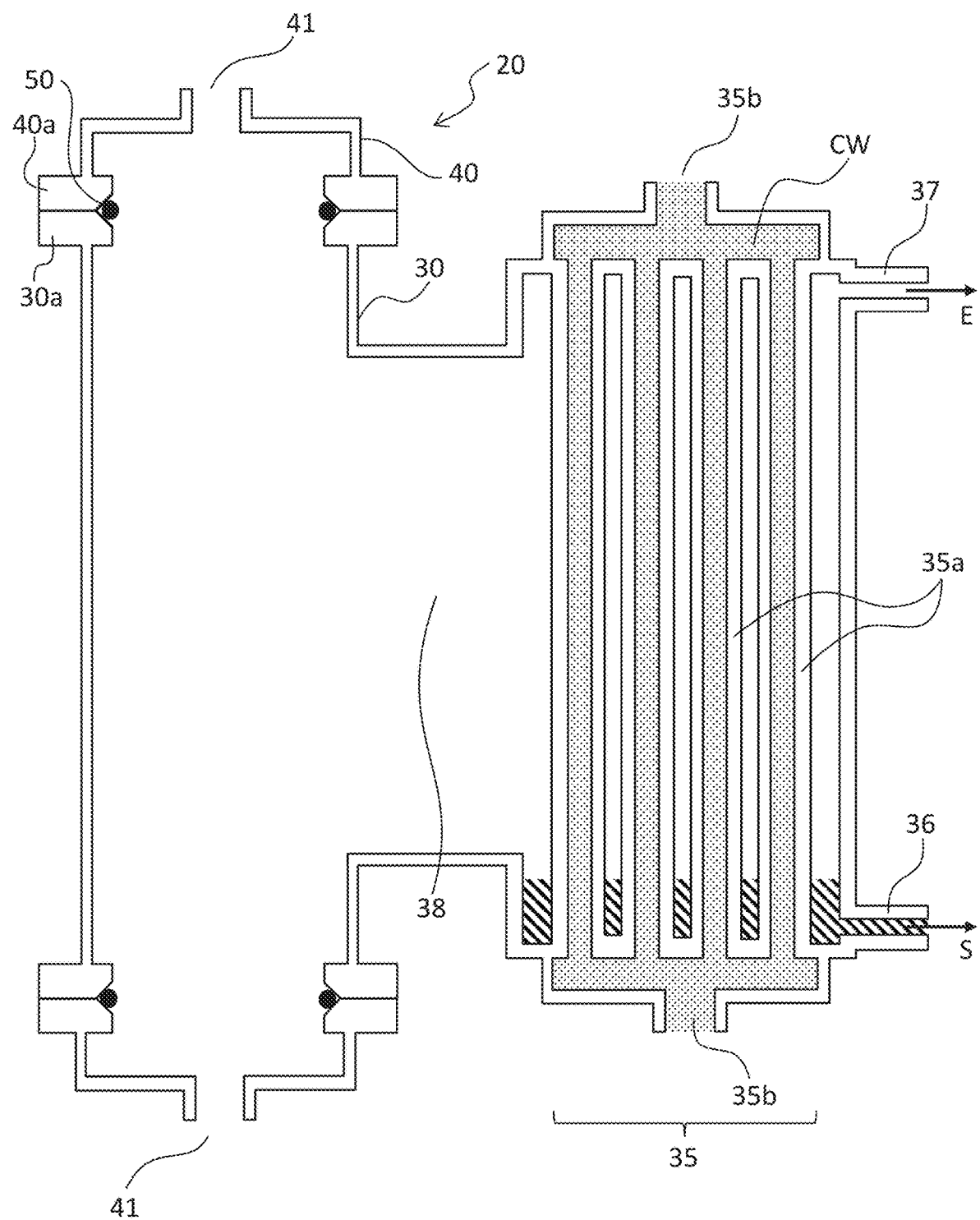
FIG. 16 is a schematic cross-sectional view detailing the structure of yet another example of a membrane distillation housing of the present invention.

The membrane distillation housing (20) of FIG. 16 has a cooler (35) in the housing body of FIG. 12 via a vapor passage (38). The cooler (35) of the membrane distillation housing (20) of FIG. 16 is a shell and tube heat exchanger. The cooler (35), which is a shell and tube heat exchanger, has a structure in which a plurality of plumbing systems (35a) are arranged in parallel, and by passing a refrigerant (for example, cooling water (CW)) through the plumbing (35a), the vapor can be condensed on the outer surface of the plumbing (35a). The cooler (35) is arranged so that the longitudinal direction of the plumbing (35a) is parallel with the longitudinal direction of the membrane cartridge for membrane distillation (not illustrated).

Refrigerant can circulate though the interior of the plumbing (35a) via the upper and lower apertures (35b) of the cooler (35). The circulation direction of the refrigerant may be either from top to bottom or from bottom to top, but it is preferable to circulate from bottom to top because the air inside the plumbing (35a) can be easily removed.

The membrane distillation housing (20) of FIG. 16 has a distilled water outlet (36) in the lower part near the cooler (35), and the recovered solvent (S), i.e., distilled water, can be discharged from the distilled water outlet (36).

The membrane distillation housing (20) of FIG. 16 has an exhaust port (37) at the upper part near the cooler (35) for decompressing the gas phase unit of the housing body. The membrane distillation housing (20) is operated by connecting, for example, a vacuum pump (not illustrated) to the exhaust port (37), and by setting the gas phase unit of the housing body to reduced pressure, decompressive distillation can be carried out. The exhaust port (37) may be arranged at an arbitrary position in the membrane distillation housing (20), or the distilled water outlet (36) may also have the function of an exhaust port.

It should be noted that reference sign "E" in FIG. 16 represents the exhaust from the exhaust port (37).

In the membrane distillation housing (20) of FIG. 16, as the cooler (35), another cooler such as a plate heat exchanger may be arranged in place of the shell and tube heat exchanger.

Figure 17:
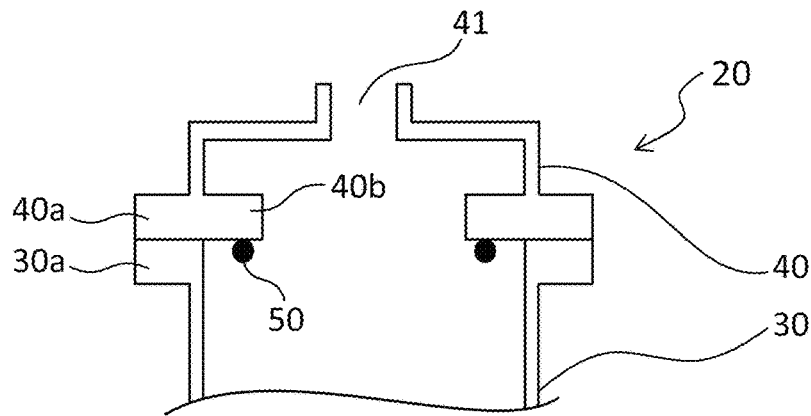
FIG. 17 is a schematic partial cross-sectional view detailing the structure of yet another example of a membrane distillation housing of the present invention.

FIG. 17 shows a partial cross-sectional view of a variation of the housing lid of the membrane distillation housing.

The housing lid (40) of FIG. 17 has a housing lid chin (40b) for supporting the membrane cartridge for membrane distillation via the sealing member (50). The housing lid chin (40b) is a convex portion protruding inward from the inner wall of the housing lid (40), and may protrude so as to surround the inner wall or may intermittently protrude on an orbit surrounding the inner wall. The housing lid chin (40b) of the housing lid (40) of FIG. 17 protrudes at a position substantially symmetrical to the housing lid flange (40a), but is not limited to this aspect.

The housing body (30) of the membrane distillation housing (20) of FIG. 17 may be identical to the housing body of the membrane distillation housing (20) of FIG. 12, or may be identical to the housing body in the membrane distillation housing of FIG. 15. When two housing lids are attached to the membrane distillation housing, both housing lids may be housing lids (40) as shown in FIG. 17, or one of the housing lids may be the housing lid (40) shown in FIG. 17, and the other may be a housing lid of another aspect (for example, the aspect shown in FIG. 12).

<<Sealing Member>>

The sealing member seals between the membrane distillation housing and the membrane affixation part of the membrane cartridge for membrane distillation when the membrane cartridge for membrane distillation is housed in the membrane distillation housing to form a membrane distillation module, and has a function of dividing the membrane distillation module into a liquid phase unit in which the treatment target liquid circulates and a gas phase unit in which vapor generated from the treatment target liquid passes through the hydrophobic porous membrane and diffuses. By using a sealing member of suitable material and size, the movement of the treatment target liquid and vapor other than that passing through the hydrophobic porous membrane of the membrane distillation module is blocked, whereby efficient membrane distillation can be carried out.

As the sealing member, for example, a ring seal, a gasket, or packing can be used. Examples of the ring seal include an O-ring. When the housing lid is attached to the housing body via an O-ring, the O-ring has a function to fill the gap between the membrane distillation housing and the membrane cartridge for membrane distillation by compressing and crushing the cross-section thereof. By using a flexible material for this O-ring, the difference in the amount of dimensional change between the housing and the cartridge due to temperature changes is absorbed, whereby the airtightness of the membrane distillation module is maintained.

From the viewpoints described above, the sealing member is preferably flexible. Further, in order to maintain the reduced pressure in the presence of a pressure difference via the sealing member, it is preferable that the sealing member have an appropriate hardness. Specifically, the indentation hardness (durometer hardness) measured with a type A durometer is preferably A20 to A90, and more preferably A40 to A90.

The material constituting the sealing member preferably contains, for example, at least one selected from the group consisting of epoxy resins, vinyl ester resins, urethane resins, unsaturated polyester resins, olefin polymers, silicone resins, and fluorine-containing resins. From the viewpoint of heat resistance, chemical resistance, and flexibility, it more preferably contains one or more selected from olefin polymers, silicone resins, and fluorine-containing resins.

<<Membrane Distillation Module>>

In the membrane distillation module of the present embodiment, the membrane cartridge for membrane distillation is housed in the membrane distillation housing, and the outside surface of the membrane affixation part of the membrane cartridge for membrane distillation is supported on the inner surface of the membrane distillation housing via a sealing member, and the membrane cartridge and the membrane distillation housing are sealed.

The interior of the membrane distillation module is divided into a liquid phase unit in which the treatment target liquid circulates, and a gas phase unit in which vapor generated from the treatment target liquid passes through the hydrophobic porous membrane and diffuses by the hydrophobic porous membrane, the membrane affixation part, and the sealing member.

In the membrane distillation module of the present embodiment, by supporting the outside surface of the membrane affixation part on the inner surface of the membrane distillation housing via the sealing member, the membrane cartridge for membrane distillation is affixed in the membrane distillation housing. As used herein, the portion near the sealing member in which the membrane cartridge for membrane distillation is supported and affixed in the membrane distillation housing is referred to as a "support unit."

In the membrane distillation module of the present embodiment, in a cross-section of the support unit perpendicular to an axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), the membrane distillation module has a value C represented by the following formula:

$$C = \frac{d_E - d_F}{d_F(k_F - k_E)} \quad \text{[Formula 5]}$$

of 30° C. or greater.

As used herein, "equivalent circle diameter" means the diameter of a circle (equivalent circle) having an area which is the same as that of a predetermined planar drawing. Thus, for example, if the membrane cartridge for membrane distillation is columnar and the cross-section of the membrane affixation part of the support unit is circular, the equivalent circle diameter of this membrane affixation part is equal to the diameter of the membrane affixation part. When the membrane cartridge for membrane distillation is a regular tetragonal column and the cross-section of the membrane affixation part of the support unit is a square with a side length of a, the equivalent circle diameter d can be calculated as follows.

Area of square $= a^2$

Area of converted circle $= \pi \times (d/2)^2$

Since these are equal, $\pi \times (d/2)^2 = a^2$

Thus, $d = \sqrt{\{(4 \times a^2)/\pi\}}$

Specifically, for example, it can be calculated that when the length of one side is a=30 mm, d=33.9 mm; when a=50 mm, d=56.4 mm; when a=100 mm, d=113 mm; and when a=300 mm, d=339 mm, and when the cross-section of the membrane affixation part of the support unit is square, the equivalent circle diameter d thereof is a value slightly larger than the length a of one side of the square (a value about 1.13-fold).

The right-hand side expression "$d_E - d_F$" in the above equation indicates the gap (mm) between the inner surface of the housing and the outer circumference of the membrane affixation part at a certain temperature, for example, room temperature. The right-hand side expression $d_F(k_F - k_E)$ of the denominator indicates the difference (mm/° C.) in the coefficient of thermal expansion due to thermal expansion with increasing temperature on the inner surface of the housing and the outer circumference of the membrane affixation part. Thus, the value of C calculated by the above formula represents the amount of temperature increase (° C.) required to fill the gap between the inner surface of the housing and the outer circumference of the membrane affixation part due to thermal expansion accompanying the temperature rise.

When the gap between the inner surface of the housing and the outer circumference of the membrane affixation part differs depending on the measurement location, the value of the location where "$d_E-d_F$" is minimum is used for the values of $d_E$ and $d_F$.

When the housing is composed of a plurality of types of materials, the coefficient of linear expansion of the material forming the portion of the inner surface of the housing closest to the membrane affixation part is used as the value of $k_E$. When the inner surface of the housing that is closest to the membrane affixation part is composed of a plurality of types of materials, the coefficient of linear expansion of the material having the largest $k_F-k_E$ value is used as the value of $k_E$. An example of the case in which the portion of the inner surface of the housing closest to the membrane affixation part is composed of a plurality of types of materials includes the case in which the material constituting the housing body and the constituent material of the housing lid are different.

Under the high-temperature conditions in which membrane distillation is carried out, when there is a significant difference in the amount of dimensional change due to the difference in the coefficient of linear expansion between the affixation resin of the membrane cartridge for membrane distillation and the portion of the housing body which is in contact with the sealing member, there is a risk that the airtightness of the membrane distillation housing may be impaired. Therefore, in the cross-section of the support unit of the membrane distillation module, it is preferable that the gap between the membrane affixation part of the membrane cartridge for membrane distillation and the portion of the housing body in contact with the sealing member be a certain value or greater. Specifically, it is necessary that the value C calculated by the above formula be 30° C. or higher, preferably 50° C. or higher, and more preferably 100° C. or higher, 120° C. or higher, or 150° C. or higher. Conversely, in order to ensure sealing between the membrane distillation housing and the membrane affixation part of the membrane cartridge for membrane distillation by the sealing member, the value C is preferably 10,000° C. or lower, and more preferably 5,000° C. or lower.

A more preferable range of the value C calculated by the above formula depends on the type of material constituting the housing body.

When the housing body is composed of resin, the more preferable range of C may be, for example, 200° C. or higher, 500° C. or higher, 1,000° C. or higher, 1,200° C. or higher, or 1,500° C. or higher, and, for example, 3,000° C. or lower, 2,500° C. or lower, or 2,000° C. or lower.

When the housing body is metal, the more preferably range of C may be, for example, 50° C. or higher, 70° C. or higher, or 80° C. or higher, and, for example, 3,000° C. or lower, 2,500° C. or lower, 2,000° C. or lower, 1,500° C. or lower, 1,200° C. or lower, or 1,000° C. or lower.

In the membrane distillation module of the present embodiment, in a state in which the membrane cartridge for membrane distillation is housed in the membrane distillation housing, the outside surface of the membrane affixation part of the membrane cartridge for membrane distillation may be supported on the inner surface of the membrane distillation housing via the sealing member, and the end surface of the membrane affixation part of the membrane cartridge for membrane distillation may be supported by the chin protruding inward of the membrane distillation housing via the sealing member.

When the outside surface of the membrane affixation part is supported by the inner surface of the membrane distillation housing via a sealing member, the length of the sealing member in the direction perpendicular to the axial direction of the membrane cartridge for membrane distillation (i.e., the thickness of the sealing member in the sealed state) is, from the viewpoint of ensuring sufficient sealing properties, preferably 1 mm or more, and more preferably 1.5 mm or more. From the same viewpoints, this length is preferably 20 mm or less, more preferably 15 mm or less, and further preferably 10 mm or less.

Conversely, when the end surface of the membrane affixation part is supported by the chin protruding inward of the membrane distillation housing via the sealing member, the length of the sealing member in the direction parallel to the axial direction of the membrane cartridge for membrane distillation is preferably 1 mm or more, and more preferably 1.5 mm or more, from the viewpoint of ensuring sufficient sealing properties. From the same viewpoint, this length is preferably 20 mm or less, more preferably 15 mm or less, and further preferably 10 mm or less.

Figure 18:
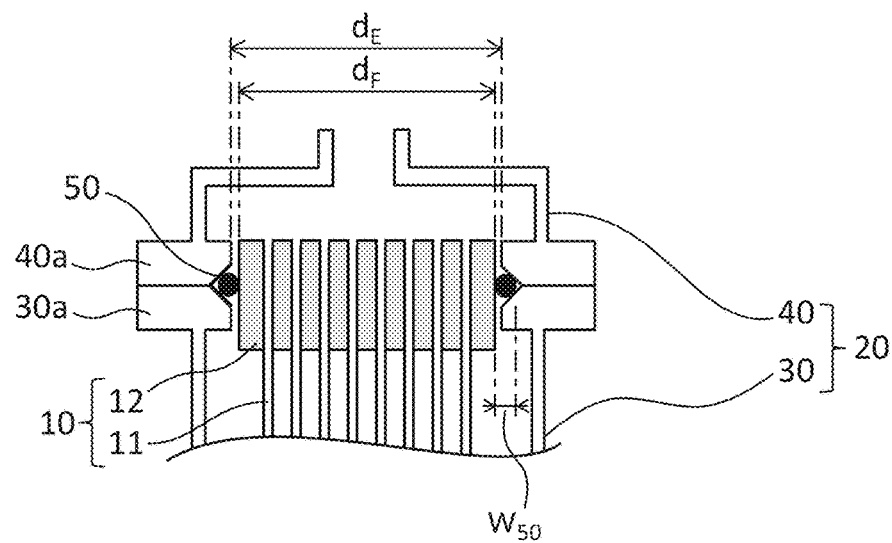
FIG. 18 is a schematic cross-sectional view showing an example of an aspect in which a membrane cartridge for membrane distillation is affixed in a membrane distillation housing via a sealing member.

As an example of the case in which the porous membranes are hollow fiber, a plurality of hollow fiber porous membranes are bundled together, and the membrane cartridge for membrane distillation and the membrane distillation housing each have a substantially cylindrical shape, a typical example of the case where the outside surface of the membrane affixation part of the membrane cartridge for membrane distillation is supported on the inner surface of the membrane distillation housing via the sealing member is shown as a schematic cross-sectional view in FIG. 18.

In FIG. 18, the equivalent circle diameter of the outer circumference of the support unit of the membrane affixation part (12) of the membrane cartridge for membrane distillation (10) of the membrane distillation module is the length represented by the sign "$d_F$." The equivalent circle diameter of the inner circumference of the membrane distillation housing (20) is the length represented by the sign "$d_E$." The smaller of the equivalent circle diameter of the inner circumference of the housing body (30) and the equivalent circle diameter of the inner circumference of the housing lid (40) of the support unit (60) is used as the equivalent circle diameter of the inner circumference of the membrane distillation housing (20). When the inside of the housing body flange (30a), the inside of the housing lid flange (40a), or both have a notch, this notch is not considered in the calculation of the equivalent circle diameter. By understanding in this manner, when calculating the C value by the above formula, the gap between the membrane distillation housing and the membrane cartridge for membrane distillation can be included in the calculation.

In FIG. 18, the length in the direction perpendicular to the axial direction of the membrane cartridge for membrane distillation (10) of the sealing member (50) is the length represented by the sign "$w_{50}$."

It should be noted that when the material constituting the housing body (30) and the material constituting the housing lid (40) are different, the value having the smaller coefficient of linear expansion is used as the coefficient of linear expansion ($k_E$) of material constituting the membrane distillation housing in the above formula for calculating the C value.

Figure 19:
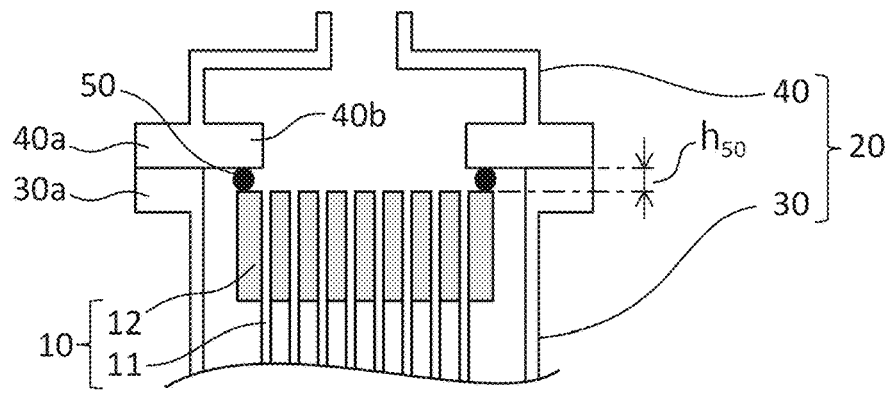
FIG. 19 is a schematic cross-sectional view showing another example of an aspect in which a membrane cartridge for membrane distillation is affixed in a membrane distillation housing via a sealing member.

As an example of the case in which the porous membranes are hollow fiber, a plurality of hollow fiber porous membranes are bundled together, and the membrane cartridge for membrane distillation and the membrane distillation housing each have a substantially cylindrical shape, a typical example of the case in which the end surface of the membrane affixation part of the membrane cartridge for membrane distillation is supported by the chin protruding inward of the membrane distillation housing via the sealing member is shown as a schematic cross-sectional view in FIG. 19.

In FIG. 19, the end surface of the membrane affixation part (12) of the membrane cartridge for membrane distillation (10) is supported by a housing lid chin (40b) protruding inward of the membrane distillation housing (20) via a sealing member (50).

In FIG. 19, the length of the sealing member (50) in the direction parallel to the axial direction of the membrane cartridge for membrane distillation (10) is the length represented by the sign "$h_{50}$."

Specific aspects of the membrane distillation module will be described below while referring to the drawings.

A schematic cross-sectional view of the case in which the hydrophobic porous membranes are hollow fiber, a plurality of hollow fiber porous membranes are bundled together, and the membrane distillation module has a substantially columnar shape is shown. FIG. 1(A) is a cross-sectional view of the membrane cartridge for membrane distillation in a direction parallel to the axial direction, and FIG. 1(B) is a cross-sectional view taken along line A-A in FIG. 1 (A).

The membrane distillation module (100) shown in FIG. 1 comprises a cylindrical membrane cartridge for membrane distillation (10) which contains the bundles of hollow fiber hydrophobic porous membranes (11), and a membrane distillation housing (20) housing the membrane cartridge for membrane distillation (10).

The membrane cartridge for membrane distillation (10) has a membrane affixation part (12) in which a hydrophobic porous membrane (11) is affixed with an affixation resin at the axial direction ends of the columnar shape.

The membrane distillation housing (20) has a housing body (30) and two housing lids (40) attached thereto.

The housing body (30) and the housing lid (40) are affixed by the housing body flange (30a) and the housing lid flange (40a), respectively. By supporting the outside surface of the membrane affixation part (12) of the membrane cartridge for membrane distillation (10) on the inner surface of the membrane distillation housing in the vicinity of the affixation part between the housing body (30) and the housing lid (40) via an O-ring sealing member (50), the membrane cartridge for membrane distillation (10) has a support unit (60) affixed within the membrane distillation housing (20).

The interior of the membrane distillation housing (20) is divided, by the hydrophobic porous membrane (10), the membrane affixation part (12), and the sealing member (50), into a liquid phase unit (70) in which the treatment target liquid circulates, and a gas phase unit (80) in which vapor generated from the treatment target liquid passes through a hydrophobic porous membrane (11) and diffuses. The liquid phase unit (70) may be composed of, for example, the internal space of the housing lid (40) and bore side of the hollow fiber hydrophobic porous membrane (11). The gas phase unit (80) may be, for example, a space surrounded by the inner wall of the housing body (30), the shell surface of the hydrophobic porous membrane (11), and the membrane affixation part (12).

The housing body (30) has a vapor outlet (31) which is connected to the gas phase unit (80) of the membrane distillation module (100) on the side surface thereof, and is for discharging vapor in the gas phase unit (80) to the outside of the membrane distillation module (100). Each of the two using lids (40) has a lid aperture (41) for circulation of the treatment target water that opens from the inside to the outside of the housing lid.

In FIG. 1, the present invention encompasses the configuration wherein the liquid phase unit and the gas phase unit are reversed, the internal space of the housing lid (40) and the bore side of the hollow fiber hydrophobic porous membrane (11) serve as the gas phase unit, and the space surrounded by the inner wall of the housing body (30), the shell surface of the hydrophobic porous membrane (11), and the membrane affixation part (12) serves as the liquid phase unit.

With reference to FIG. 1(B), it can be understood that a plurality of hydrophobic porous membranes (11) are bundled at a distance from each other and affixed to the membrane affixation part (12), and by affixing the plurality of hydrophobic porous membranes (11) so as to be spaced from each other, the gaps in the hydrophobic porous membrane (11) can form a gas phase unit that facilitates the circulation of vapor.

FIG. 1 (B) shows the lengths of the inner circumference equivalent circle diameter ($d_E$) of the membrane carbon housing (20) and the outer circumference equivalent circle diameter ($d_F$) of the membrane affixation part (12). The difference between the two ($d_E$–$d_F$) is approximately equal to twice the gap between the membrane distillation housing (20) and the membrane affixation part (12). The gap between the membrane distillation housing (20) and the membrane affixation part (12) is filled with an O-ring sealing member (50).

When membrane distillation is carried out using the membrane distillation module of the present embodiment, the temperature of the treatment target water at the time of introduction into the module is preferably 50° C. or higher, and more preferably 65° C. or higher, from the viewpoint of obtaining suitable distillation efficiency. Conversely, from the viewpoint of suppressing the energy consumption required for membrane distillation, the treatment target water temperature at the time of introduction is preferably 95° C. or lower, and more preferably 90° C. or lower.

The temperature of treatment target water may be increased by, for example, a heat source such as a heat exchanger or a heater, or may be increased by utilizing waste heat from an industrial process or solar heat. Utilization of solar heat or waste heat is preferable from the viewpoint of reducing the thermal energy cost required for heating the treatment target water. If the temperature of treatment target water prior to heating is 50° C. or higher, waste heat can be effectively used.

The membrane distillation module of the present embodiment as described above can exhibit an extremely high amount of permeated water (flux, distilled water yield).

The amount of permeated water (Flux) that can be realized by membrane distillation may be appropriately set in accordance with the temperature of the treatment target water. However, from the viewpoint of balancing the improvement of the production efficiency of distilled water and the suppression of salt permeation, the following settings can be exemplified.

Using 3.5 wt % of salt water at 65° C. as the treatment target water (raw water), and under conditions in which the treatment target water is brought into contact with the bore side of the hollow fiber hydrophobic porous membrane having a linear velocity of 100 cm/sec and an effective length of 8 cm, and the outside of the hydrophobic porous membrane is decompressed at −90 kPa (G), the amount of permeated water (Flux) after continuous operation for one hour is preferably 10 kg/m²/hr or more, and more preferably 10 kg/m²/hr or more and 1,000 kg/m²/hr or less. Under the same conditions, the amount of salt (solute) precipitated on the outside of the hydrophobic porous membrane is preferably 0.4 mg/cm²/hr or less.

The amount of flux and salt precipitated are calculated by the following formulas:

> Flux=the mass of the distilled water obtained by operation for a predetermined time/the area of the hydrophobic porous membrane/the operation time > Salt precipitation amount=the mass of salt precipitated by operation for a predetermined time/the area of the hydrophobic porous membrane/the operation time <<Membrane Distillation Apparatus>>

The membrane distillation apparatus of the present application:

may comprise, when the housing body of the present application does not comprise a cooler, the membrane distillation module of the present embodiment and a vapor condensation unit for condensing the vapor generated from the membrane distillation module, or when the housing body of the present embodiment comprises a cooler, since a vapor condensation unit is not necessary, may comprise the membrane distillation module of the present embodiment. When the housing body comprises a cooler, though it is not necessary to provide a vapor condensation unit, one may be provided.

The membrane distillation apparatus of the present embodiment comprises a membrane distillation module, and a vapor condensation unit, when present, and in addition thereto, may further comprise, for example, a condensate tank, a pressure regulator, and a decompression device.

The vapor condensation unit may have a gas phase unit connected to the vapor outlet of the membrane distillation module and a cooler for condensing the vapor that has diffused from the vapor outlet of the membrane distillation module. The low temperature of the cooler is maintained by circulating a cooling medium (for example, cooling water) in the interior thereof. The structure of the cooler may be a structure in which pipes are bundled or a structure in which plates are overlapped. When the cooler contacts with the vapor that has diffused to the gas phase unit of the vapor condensation unit, the vapor is cooled and condensed to become distilled water (permeated water). By storing this in a condensate tank and recovering it, the desired distilled water can be obtained.

Figure 20:
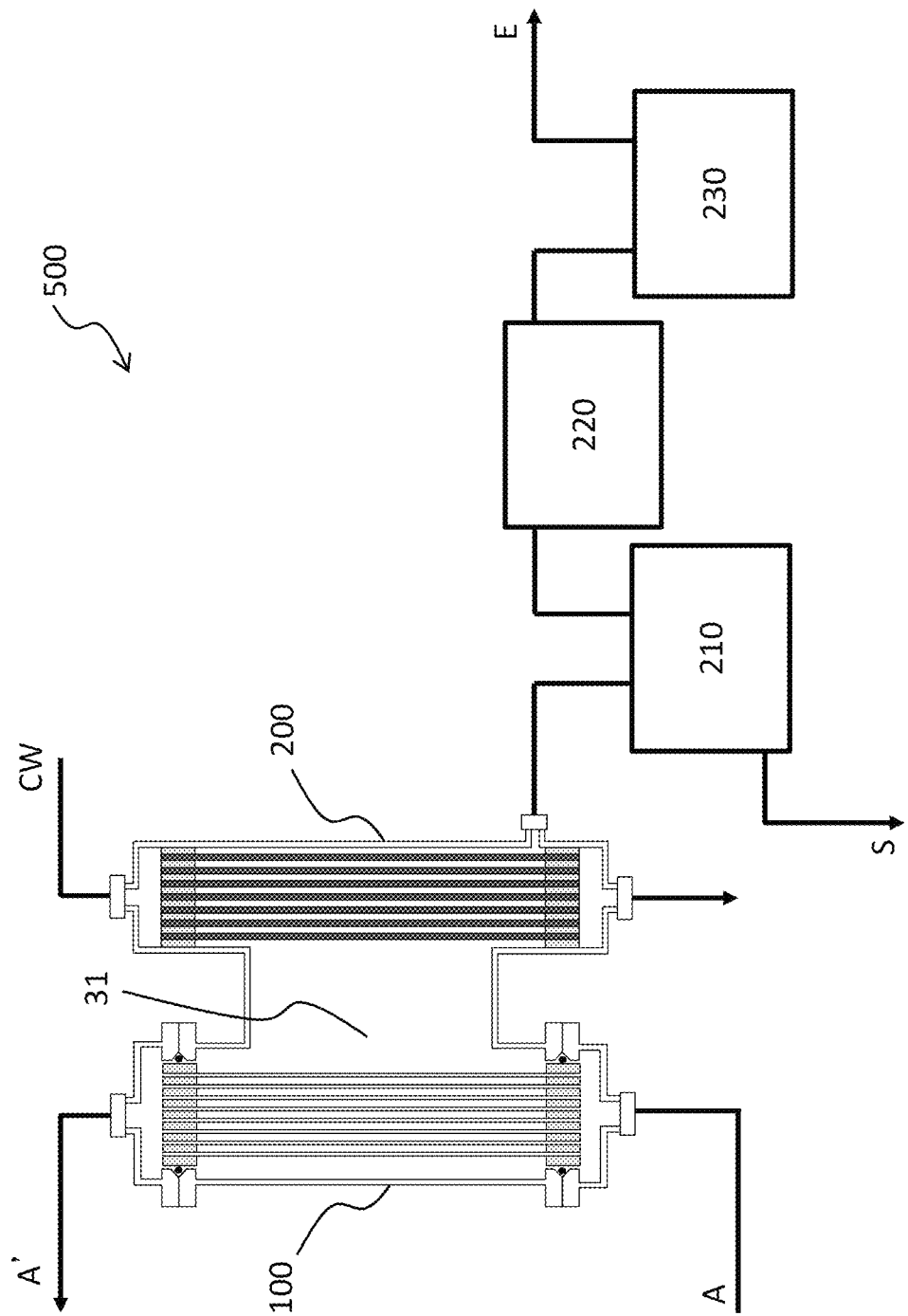
FIG. 20 is a schematic view showing the structure of an example of a membrane distillation apparatus of the present invention.

FIG. 20 shows an example of the membrane distillation apparatus of the present embodiment.

The membrane distillation apparatus (500) of FIG. 20 comprises a membrane distillation module (100) and a vapor condensation unit (200), and the gas phase unit of the membrane distillation module (100) is connected to the gas phase unit of the vapor condensation unit (200) via the vapor outlet (31). The vapor condensation unit (200) is connected to a condensate tank (210), a pressure regulator (220), and a decompression device (230) by plumbing.

The function of the membrane cartridge for membrane distillation of the membrane distillation module (100) is as described above.

The gas phase unit of the vapor condensation unit (200) is adjusted to an appropriate reduced pressure by the pressure regulator (220) and the decompression device (230) via the condensate tank (210). The cooler of the vapor condensation unit (200) is cooled by cooling water (CW). In the membrane distillation apparatus (500) of FIG. 20, cooling water (CW) is introduced from the upper part of the vapor condensation unit (200), circulates downward in the interior of the vapor condensation unit (200), and is discharged from the lower part thereof. However, the cooling water (CW) may be introduced from the lower part of the vapor condensation unit (200), circulated upward in the interior of the vapor condensation unit (200), and discharged from the upper part thereof. It is preferable that the cooling water (CW) circulate upward in the interior of the vapor condensation unit (200) because it is easy to remove the air inside the plumbing.

The vapor generated from treatment target water (A) by membrane cartridge for membrane distillation of membrane distillation module (100) diffuses into the gas phase unit of the vapor condensation unit (200) via the vapor outlet (31). When the diffused vapor contacts with the cooler of the vapor condensation unit (200), it is condensed into condensed water, which is stored in a condensate tank and used as the desired distilled water (S) for a predetermined purpose.

It should be noted that reference sign "E" in FIG. 20 indicates exhaust from the decompression device (230).

Figure 21:
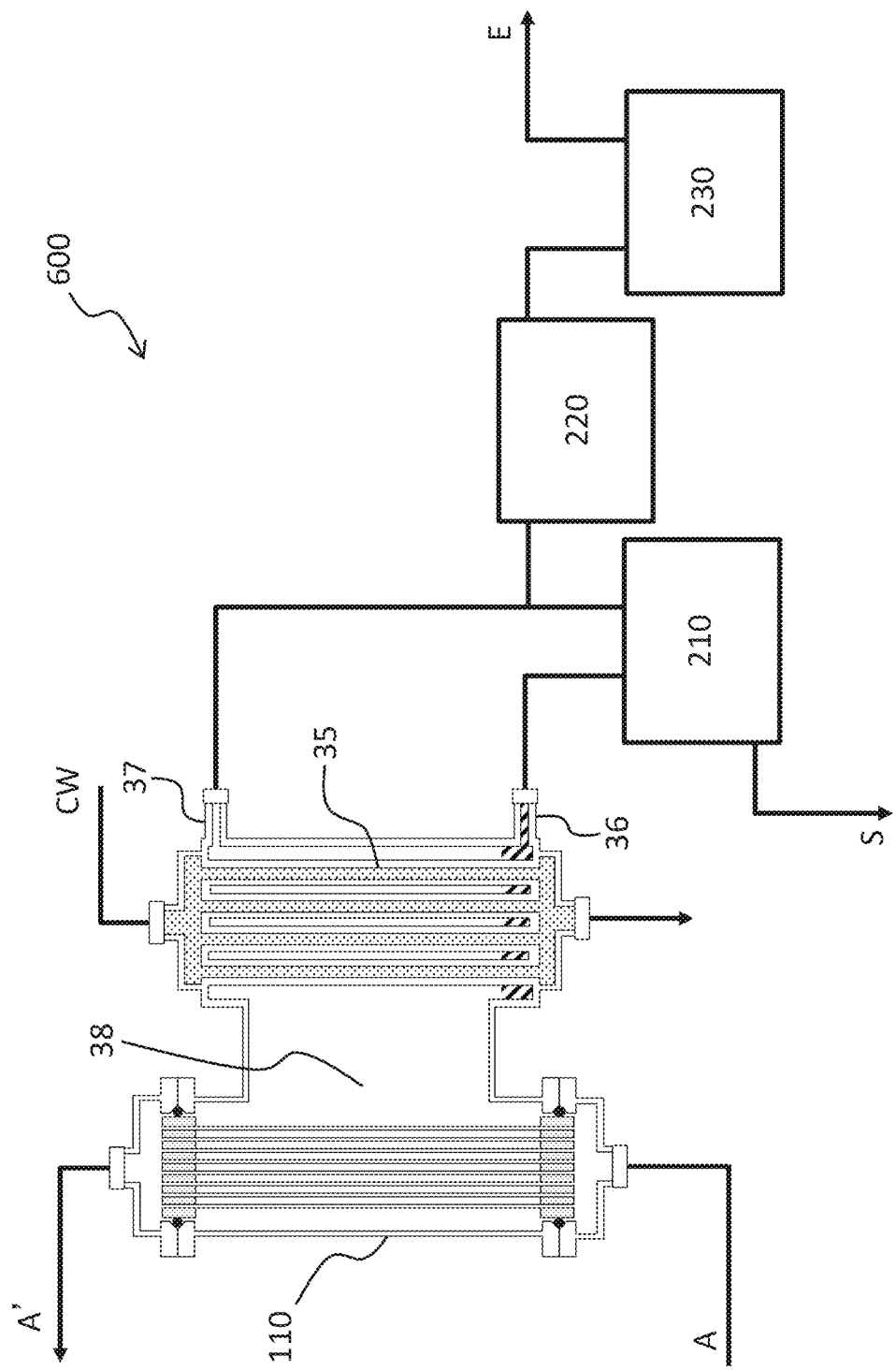
FIG. 21 is a schematic view showing the structure of another example of a membrane distillation apparatus of the present invention.

FIG. 21 shows another example of the membrane distillation apparatus of the present embodiment.

The membrane distillation apparatus (600) of FIG. 21 comprises a membrane distillation module (110). The membrane distillation housing of this membrane distillation module (110) has a cooler (35), like the membrane distillation housing shown in FIG. 16. The membrane distillation module (110) is configured such that the gas phase unit of the membrane cartridge for membrane distillation is connected to the gas phase unit of the cooler (35) via the vapor passage (38). The membrane distillation apparatus (600) has a distilled water outlet (36) below the cooler (35) side, and an exhaust port (37) above the cooler (35) side. The distilled water outlet (36) and exhaust port (37) are connected to the condensate tank (210), the pressure regulator (220), and the decompression device (230) by plumbing.

The function of the membrane cartridge for membrane distillation of the membrane distillation module (110) is as described above.

The gas phase unit of the cooler (35) of the membrane distillation apparatus (600) is adjusted to an appropriate reduced pressure by the pressure regulator (220) and the decompression device (230) via the condensate tank (210). The cooler (35) is cooled by cooling water (CW). In the membrane distillation apparatus (600) of FIG. 21, the cooling water (CW) is introduced from the upper part of the cooler (35), circulates downward in the interior of the cooler (35), and is discharged from the lower part thereof, though this direction may be reversed.

The vapor generated from the treatment target water (A) by the membrane cartridge for membrane distillation of the membrane distillation module (110) diffuses into the gas phase unit of the cooler (35) via the vapor passage (38). When the diffused vapor contacts with the cooler (35), it is condensed into condensed water, which is stored in a condensate tank and used as the desired distilled water (S) for a predetermined purpose.

Reference sign "E" in FIG. 21 indicates exhaust from the decompression device (230).

The cooling medium is not particularly limited as long as it flows inside the cooler and can cool and condense the vapor. Cooling water is preferable as the cooling medium, and examples thereof include tap water, industrial water, river water, well water, lake water, seawater, industrial wastewater (wastewater from food factories, chemical factories, electronic industry factories, pharmaceutical factories, and cleaning factories), as well as water discharged during oil and natural gas production. The treatment target water provided for membrane distillation may be used as the cooling medium. From the viewpoint of cooling and condensation efficiency, the cooling medium preferably has a temperature lower than the temperature of the treatment target water at the time of introduction into the membrane distillation module by 2° C. or higher, and more preferably 5° C. or higher. The cooling medium may be used by heating with a heat source such as a heat exchanger or a heater. In a preferred embodiment, the cooling medium circulates in the direction opposite to the circulation direction of the vapor.

Examples of the decompression device include a diaphragm vacuum pump, a dry pump, an oil rotary vacuum pump, an ejector, or an aspirator. Examples of the pressure control method including a pressure regulator include a method using a vacuum regulator or a leak valve, and a method using an electronic vacuum controller and a solenoid valve.

The gas phase unit pressure of the membrane distillation apparatus is preferably 1 kPa or more, more preferably 5 kPa or more, from the viewpoint of suppressing the energy consumption required for decompressing the decompression device, and from the viewpoint of obtaining an efficient amount of water produced, it is preferable that the pressure be equal to or less than the saturated vapor pressure of water at the temperature of the treatment target water at the introduction point of the treatment target water.

<<Washing of Hydrophobic Porous Membrane>>

When the membrane distillation is operated for a long period of time with the membrane distillation module of the present embodiment, inorganic salts, organic substances, fine particles, oils, and metals contained in the treatment target water are deposited on and adhere to the liquid phase unit side (treatment target water side) of the hydrophobic porous membrane whereby the through holes of the porous membrane may become blocked (clogging), and the distilled water production efficiency may decrease. In such a case, operation can be temporarily halted and the hydrophobic porous membrane can be washed to restore production efficiency.

The hydrophobic porous membrane can be washed by contacting the porous membrane with a washing liquid capable of dissolving the precipitate which caused the clogging. Specifically, for example, the washing liquid may be applied by a method such as flowing the washing liquid on the surface of the hydrophobic porous membrane or inside the membrane at a high flow velocity.

The washing liquid may be appropriately selected depending on the type of precipitate. When the precipitate is an inorganic salt or a metal, acidic water can be used as the washing liquid. Specifically, for example, when the precipitate is calcium carbonate, which is a common scale, hydrochloric acid or an aqueous solution of citric acid may be used as the washing liquid. When the precipitate is an organic microorganism (slime), for example, an aqueous solution of sodium hypochlorite may be used as the washing liquid. When the precipitate is fine particles, the fine particles may be physically removed from the surface of the porous membrane by flowing an appropriate solvent at a high flow velocity.

When washing precipitates adhering to the pores of the hydrophobic porous membrane, for example, the porous membrane can be washed by a method of wetting the porous membrane with alcohol or a mixed solution of alcohol and water, and then flowing an appropriate solvent. At this time, the interiors of the pores can be washed by flowing the solvent while applying pressure in the thickness direction of the porous membrane. Alternatively, membrane distillation may be carried out using purified water as the treatment target water to move the precipitate from the pores to the membrane surface, and then the membrane surface is washed.

Washing of the hydrophobic porous membrane may be carried out with the membrane cartridge for membrane distillation attached to the membrane distillation housing. However, the washing operation can be simplified by removing the membrane cartridge for membrane distillation from the membrane distillation housing and then washing the membrane.

<<Usage of Membrane Distillation>>

The membrane distillation module according to the present embodiment and the membrane distillation apparatus including the same can be suitably used for purification by highly removing ions, organic substances, and inorganic substances contained in the treatment target water, or for removing water from the treatment target water and concentrating it. Specific examples of these usages include desalination of seawater, production of marine water, production of ultrapure water (semiconductor factories), production of boiler water (thermal power plants), fuel cell system water treatment, industrial wastewater treatment (food factories, chemical factories, electronic industry factories, pharmaceutical factories, and cleaning factories), water production for dialysis, water production for injection, associated water treatment (for example, accompanying water during mining of heavy oil, shale oil, shale gas, oil seam gas, and other natural gases), as well as the recovery of valuable resources from seawater.

<<Combination with Other Technologies>>

The membrane distillation module according to the present embodiment and the membrane distillation apparatus including the same may be used as a complex system in combination with other water treatment technologies. For example, by further purifying the concentrated water produced by the RO (Reverse Osmosis) method by the membrane distillation apparatus according to the present embodiment, the water recovery rate can be further increased. The membrane distillation module according to the present embodiment and the membrane distillation apparatus including the same can be used as a means for recovering the DS (Draw Solution) used in the FO (Forward Osmosis) method.

EXAMPLES

The structure and effects of the present invention will be specifically described below in the form of Examples, but the present invention is not limited to the following Examples.

<<Measurement of Various Physical Properties of Porous Hollow Fiber Membrane>>

[Outer Diameter, Inner Diameter, and Membrane Thickness]

The outer and inner diameters of the porous hollow fiber membrane were measured by thinly cutting the hollow fiber membrane with a razor in the direction perpendicular to the longitudinal direction thereof, and measuring the outer diameter and inner diameter of the cross-section using a microscope. The membrane thickness was calculated by the following formula (1).

[Formula 6]

$$\text{Membrane Thickness [mm]} = \frac{\text{Outer Diameter [mm]} - \text{Inner Diameter [mm]}}{2} \quad (1)$$

[Average Pore Diameter]

The average pore diameter of the porous hollow fiber membrane was measured by the method for measuring the average pore diameter (also known as the half-dry method) described in ASTM:F316-86.

The measurement was carried out on a porous hollow fiber membrane having a length of approximately 10 cm using ethanol as the liquid under the standard measurement conditions of 25° C. and a pressure increase rate of 0.01 atm/sec.

The average pore diameter was calculated by the following formula (2).

Average pore diameter [μm]=2,860×(surface tension of liquid used [dyne/cm])/(half-dry air pressure [Pa]) (2)

A value of 21.97 dyne/cm was used as the surface tension of ethanol at 25° C.

[Maximum Pore Diameter]

The maximum pore diameter of the porous hollow fiber membrane was measured using the bubble point method. One end of a porous hollow fiber membrane having a length of 8 cm was closed, and a nitrogen gas supply line was connected to the other end via a pressure gauge. In this state, nitrogen gas was supplied to purge the inside of the line with nitrogen, and the porous hollow fiber membrane was then immersed in ethanol. At this time, the porous hollow fiber membrane was immersed in ethanol with the line being slightly pressurized with nitrogen so that ethanol would not flow back into the line. With the porous hollow fiber membrane in an immersed state, the pressure of nitrogen gas was slowly increased, and the pressure P at which nitrogen gas bubbles began to stably emerge from the shell surface of the porous hollow fiber membrane was recorded. From this value, the maximum pore diameter d [μm] of the porous hollow fiber membrane was calculated by the following formula (3):

$$d = C1\gamma/P \quad (3)$$

where C1 is a constant, γ is surface tension [dyne/cm], and P is pressure [Pa]. The value of the product of the constant C1 and the surface tension γ when ethanol was used as the immersion solution was C1γ=0.0879 [N/m].

[Porosity]

The porosity of the porous hollow fiber membrane was determined by the method described below.

The hollow fiber membrane was cut to a predetermined length, its weight was measured, and the porosity was determined by the following formula (4):

[Formula 7]

$$\text{Porosity[\%]} = 100 - \frac{\text{Mass of Porous Hollow Fibers[g]} \times 100}{\text{Polymer Density[g/cm}^3\text{]} \times \left(\left(\frac{\text{Outer Diameter}}{2}\text{[cm]}\right)^2 - \left(\frac{\text{Inner Diameter}}{2}\text{[cm]}\right)^2\right) \times 3.14 \times \text{length[cm]}} \quad (4)$$

<<Implementation of Membrane Distillation>>

The membrane distillation in Examples 1 to 11 and Comparative Example 1 was carried out with the membrane distillation apparatus having the configuration shown in FIG. 20.

The membrane cartridge for membrane distillation of the membrane distillation module (100) has the configuration as described in each Example and Comparative Example, and the outlet of the vapor condensation unit (200) is connected to the condensate tank (210) by plumbing. The gas phase unit of the condensate tank (210) was connected to the decompression device (230) via the pressure regulator (220) to adjust the pressure in the system.

In the bore side of the hydrophobic porous hollow fiber membrane of the membrane distillation module (100), simulated seawater (3.5 wt % sodium chloride aqueous solution) having a temperature adjusted to 90° C. as the treatment target water (A) was circulated at a flow rate of 5 L/min. Cooling water (CW) at 30° C. was circulated in the vapor condensation unit (200) at a flow rate of 10 L/min. The pressure in the system was adjusted to −70 kPaG, and membrane distillation was carried out.

The volume reduction of the treatment target water by membrane distillation was compensated by adding recovered solvent (S) (distilled water) as needed.

The membrane distillation in Examples 12 to 14 and Comparative Example 2 was carried out with the membrane distillation apparatus having the configuration shown in FIG. 21.

The membrane cartridge for membrane distillation had the same configuration as described in each Example and Comparative Example, and other embodiments were the same as those in Example 1 described above.

[Flux Measurement]

Membrane distillation was carried out, and the weight of distilled water flowing into the condensate tank (210) was measured using an integrated flow meter, and the flux was calculated in accordance with the following formula (5):

Flux=weight of distilled water obtained by membrane distillation with an operating time of 1 hour/membrane surface area/operating time (1 hour) (5)

Example 1

[Hydrophobization of Porous Hollow Fiber Membrane]

500 porous hollow fiber membranes composed of PVDF (polyvinylidene difluoride) having an inner diameter of 0.7 mm, an outer diameter of 1.3 mm, an average pore diameter of 0.21 μm as determined from ASTM-F316-86, a maximum pore diameter of 0.29 μm, a porosity of 72%, and a surface porosity of 28% determined by image analysis were cut to a length of 50 cm. The porous hollow fiber membranes were completely immersing in a fluorine resin-based water repellent FS-392B (0.5% by weight) manufactured by Fluoro Technology Co. Ltd., drawn, and dried to apply the hydrophobic polymer to the inner and outer surfaces of the porous hollow fiber membrane to impart hydrophobicity to the porous hollow fiber membrane, whereby a hollow fiber hydrophobic porous membrane (hereinafter, simply referred to as a "hollow fiber membrane") was obtained.

[Cartridge Production]

A membrane cartridge for membrane distillation having the configuration shown in FIG. 9 was prepared. Two stainless steel pipes having an outer diameter of 6 mm, an inner diameter of 5 mm, and a length of 340 mm were used as rod-shaped structures (17), which functioned as side core rods.

The 500 hollow fiber membranes described above were bundled, the outer circumferences of the side surfaces thereof were covered with a net having a fiber diameter of 100 μm, a length of 350 mm, and a width of 200 mm, and the ends thereof were affixed together with side core rods with an affixation resin composed of a thermosetting epoxy resin to form a membrane affixation part. At this time, the ends of the net were affixed every 25 mm, and the ends of the stainless steel pipes were affixed every 20 mm in the membrane affixation part. Thereafter, the length of the longitudinal direction of the membrane affixation part was adjusted to 30 mm per end by cutting both ends of the membrane affixation part by 5 mm together with the protrusions at both ends of the hollow fiber membrane bundle.

A membrane cartridge for membrane distillation (10) was prepared by covering the outer circumference of the bundle of the hollow fibers, which were covered with the net, with a non-woven fabric (breathability 5.0 mL/cm²·sec, length 290 mm×width 100 mm, polypropylene non-woven fabric), and tying and affixing with twine.

The full length of the obtained cartridge was 360 mm, the outer diameter of the membrane affixation part at the ends of the cartridge was 60 mm, the thickness of the membrane affixation part was 30 mm, the distance between the membrane affixation parts at the ends (effective length of the hollow fiber membrane) was 300 mm, the filling rate of the hollow fiber membrane bundle was 24%, and the effective membrane surface area of the hollow fiber membrane was 0.33 m². The coefficient of linear expansion of the affixation resin of the membrane affixation part of the cartridge was $80 \times 10^{-6}$ [1/° C.].

[Module Production]

A housing comprising a housing body having of a three-layer structure composed of polycarbonate/air/polycarbonate, in which two types of polycarbonate (polycarbonate) tubes having different diameters were used and which had an air layer as a heat insulation layer, and two upper and lower housing lids was used as the housing. The inner diameter of the cartridge insertion portion of the housing was 61 mm, and the coefficient of linear expansion of this portion was $70 \times 10^{-6}$ [1/° C.]. This housing had a vapor outlet having an area of 0.0030 m² (approximately 5.5 cm square) on the side surface of the outer circumference thereof.

The membrane cartridge for membrane distillation (10) obtained in the [Cartridge Production] above was inserted into the housing in a state in which the membrane affixation part was attached with an O-ring composed of FKM (vinylidene fluoride rubber) having a P-60 standard and a durometer hardness of A70 as a sealing member, and the housing lids were attached and affixed to prepare a membrane distillation module.

[Implementation and Evaluation of Membrane Distillation]

Using the membrane distillation module obtained in the [Module Production] above, a membrane distillation apparatus having the configuration shown in FIG. 20 was assembled, and membrane distillation was carried out according to the method described above.

The flux at 1 hour from the start of membrane distillation was 33 kg/m²/h, and the conductivity of the obtained recovered solvent (distilled water) was 3.0 μS/cm at 25° C. The one-hour flux was 28 kg/m²/h from the lapse of 1,000 hours after the start of membrane distillation, and the conductivity of the obtained distilled water was 8.0 μS/cm at 25° C.

From the above results, it was verified that the membrane distillation module of Example 1 could maintain its function well even after 1,000 hours of operation.

Example 2

A membrane cartridge for membrane distillation was prepared in the same manner as in Example 1 except that two polysulfone pipes having an outer diameter of 60 mm, an inner diameter of 55 mm, and a length of 70 mm were used as the cartridge case in [Cartridge Production].

The cartridge case was arranged so that the two pipes covered both axial direction ends of the hollow fiber bundle, and the central part of the hollow fiber bundle was arranged so as not to cover the length of 230 mm, and each pipe end was affixed on both axial direction ends by the membrane affixation part (a length of 30 mm from the end of the cartridge case was affixed in the membrane affixation part).

The sizes of the obtained cartridge were the same as those of Example 1, but the area of the cartridge case aperture unit of the cartridge case was 0.043 m². The coefficient of linear expansion of the membrane affixation part of this cartridge was $80 \times 10^{-6}$ [1/° C.].

A membrane distillation module was prepared in the same manner as in Example 1 except that the obtained membrane cartridge for membrane distillation was used, a membrane distillation apparatus was assembled, and membrane distillation was carried out.

The flux at 1 hour from the start of membrane distillation was 31 kg/m²/h, and the conductivity of the obtained distilled water was 2.5 μS/cm at 25° C. The one-hour flux from the lapse of 1,000 hours after the start of membrane distillation was 27 kg/m²/h, and the conductivity of the obtained distilled water was 6.0 μS/cm at 25° C.

From the above results, it was verified that the membrane distillation module of Example 2 could maintain its function well even after 1,000 hours of operation.

Example 3

A membrane distillation module was prepared in the same manner as in Example 2 except that a titanium housing having an inner diameter of 61 mm in the cartridge insertion portion of the housing body was used as the housing. The coefficient of linear expansion of the cartridge insertion portion of the housing was $8.5 \times 10^{-6}$ [1/° C.].

A membrane distillation apparatus was assembled using the obtained membrane distillation module, and membrane distillation was carried out.

The flux at 1 hour from the start of distillation was 30 kg/m²/h, and the conductivity of the obtained distilled water was 2.0 μS/cm at 25° C. The one-hour flux from the lapse of 1,000 hours after the start of membrane distillation was 25 kg/m²/h, and the conductivity of the obtained distilled water was 5.0 μS/cm at 25° C.

From the above results, it was verified that the membrane distillation module of Example 3 could maintain its function well even after 1,000 hours of operation.

Example 4

A membrane distillation module was prepared in the same manner as in Example 2 except that a membrane distillation housing having two housing lids having a housing lid chin shown in FIG. 17 was used in [Module Production], and an FKM O-ring having a P-50A standard and a durometer hardness of A70 was used as the sealing member, and a membrane distillation apparatus was assembled to carry out membrane distillation.

The flux at 1 hour from the start of distillation was 33 kg/m$^2$/h, and the conductivity of the obtained distilled water was 5.0 µS/cm at 25° C. Further, the one-hour flux from the lapse of 1,000 hours after the start of distillation was 26 kg/m$^2$/h, and the conductivity of the obtained distilled water was 6.4 µS/cm at 25° C.

From the above results, it was verified that the membrane distillation module of Example 4 could maintain its function well even after 1,000 hours of operation.

Example 5

A membrane cartridge for membrane distillation was prepared in the same manner as in Example 2 except that a stainless steel pipe having an outer diameter of 20 mm, a thickness of 3 mm, a length of 340 mm, and hollow holes, with a total of 30 holes having a diameter of 5 mm formed at 20 mm intervals on the side surface thereof was used in place of the two stainless steel pipes functioning as side core rods as the rod-shaped structure in [Cartridge Production], and it was installed in the center of the hollow fiber membrane bundle. In the obtained cartridge, the ends of the stainless steel pipe were embedded in the membrane affixation part at a depth of 20 mm per end.

A membrane distillation module was prepared in the same manner as in Example 1 except that the obtained membrane cartridge for membrane distillation was used, a membrane distillation apparatus was assembled, and membrane distillation was carried out.

The flux at 1 hour from the start of distillation was 34 kg/m$^2$/h, and the conductivity of the obtained distilled water was 4.3 µS/cm at 25° C. The one-hour flux from the lapse of 1,000 hours after the start of distillation was 29 kg/m$^2$/h, and the conductivity of the obtained distilled water was 6.2 µS/cm at 25° C.

From the above results, it was verified that the membrane distillation module of Example 5 could maintain its function well even after 1,000 hours of operation.

Example 6

A membrane cartridge for membrane distillation was prepared in the same manner as in Example 2 except that a polypropylene sponge having a thickness (width) of 5 mm, a vertical width of 40 mm, a length of 360 mm, and a porosity of 90% by volume was used in place of the two stainless steel pipes that function as side core rods as a rod-shaped structure in [Cartridge Production], and it was installed in the center of the hollow fiber membrane bundle. In the obtained cartridge, the ends of the polypropylene sponge were embedded in the membrane affixation part at a depth of 30 mm per end.

A membrane distillation module was prepared in the same manner as in Example 1 except that the obtained membrane cartridge for membrane distillation was used, a membrane distillation apparatus was assembled, and membrane distillation was carried out.

The flux at 1 hour from the start of membrane distillation was 35 kg/m$^2$/h, and the conductivity of the obtained distilled water was 5.0 µS/cm at 25° C. The one-hour flux from the lapse of 1,000 hours after the start of membrane distillation was 28 kg/m$^2$/h, and the conductivity of the obtained distilled water was 5.5 µS/cm at 25° C.

From the above results, it was verified that the membrane distillation module of Example 6 could maintain its function well even after 1,000 hours of operation.

Example 7

A hollow fiber hydrophobic porous membrane (hereinafter referred to as a "hollow fiber membrane") was obtained by the same method as Example 1. The hollow fiber membranes were put together into 100 bundles, and 5 small bundles bundled with a net were prepared. A membrane cartridge for membrane distillation was prepared in the same manner as Example 2 except that the side core rods and cartridge case were affixed with the membrane affixation part so that the 5 small bundles were arranged so that the distance between the hollow fiber membranes in the small bundle was 0.2 mm, the minor axis of the small bundle was 10 mm, and the distance between each small bundle was 5 mm.

A membrane distillation module was prepared in the same manner as in Example 1 except that the obtained membrane cartridge for membrane distillation was used, the membrane distillation apparatus was assembled, and membrane distillation was carried out.

The flux at 1 hour from the start of membrane distillation was 34 kg/m$^2$/h, and the conductivity of the obtained distilled water was 3.8 µS/cm at 25° C. The one-hour flux from the lapse of 1,000 hours after the start of membrane distillation was 27 kg/m$^2$/h, and the conductivity of the obtained distilled water was 7.0 µS/cm at 25° C.

From the above results, it was verified that the membrane distillation module of Example 7 could maintain its function well even after 1,000 hours of operation.

Example 8

A membrane distillation module was prepared in the same manner as in Example 2 except that stainless steel wool having a porosity of 90% by volume was installed as a demister in the vapor outlet of the housing, a membrane distillation apparatus was assembled, and membrane distillation was carried out.

The flux at 1 hour from the start of membrane distillation was 30 kg/m$^2$/h, and the conductivity of the obtained distilled water was 2.2 µS/cm at 25° C. The one-hour flux from the lapse of 1,000 hours after the start of membrane distillation was 22 kg/m$^2$/h, and the conductivity of the obtained distilled water was 4.3 µS/cm at 25° C.

From the above results, it was verified that the membrane distillation module of Example 8 could maintain its function well even after 1,000 hours of operation.

Example 9

A membrane distillation module was prepared in the same manner as in Example 1 except that the area of the vapor outlet of the housing was 0.0020 mm$^2$, a membrane distillation apparatus was assembled, and membrane distillation was carried out.

The flux at 1 hour from the start of membrane distillation was 18 kg/m$^2$/h, and the conductivity of the obtained distilled water was 7.0 µS/cm at 25° C. The one-hour flux from the lapse of 1,000 hours after the start of membrane distillation was 15 kg/m$^2$/h, and the conductivity of the obtained distilled water was 9.2 µS/cm at 25° C.

From the above results, it was verified that the membrane distillation module of Example 9 could maintain its function well even after 1,000 hours of operation.

Example 10

A membrane distillation cartridge was prepared in the same manner as in Example 1 except that an affixation resin made of a thermosetting urethane resin was used as the membrane attachment resin in [Cartridge Production].

Using the obtained membrane cartridge for membrane distillation, a membrane distillation module was prepared in the same manner as in Example 3 except that a silicone O-ring having a P-60 standard and a durometer hardness of A40 was used, a membrane distillation apparatus was assembled, and membrane distillation was carried out.

The flux at 1 hour from the start of membrane distillation was 31 kg/m$^2$/h, and the conductivity of the obtained distilled water was 2.8 µS/cm at 25° C. The one-hour flux from the lapse of 1,000 hours after the start of membrane distillation was 28 kg/m$^2$/h, and the conductivity of the obtained distilled water was 6.5 µS/cm at 25° C.

From the above results, it was verified that the membrane distillation module of Example 10 could maintain its function well even after 1,000 hours of operation.

Comparative Example 1

In Comparative Example 1, a membrane distillation module having a structure in which the hollow fiber membrane bundle was directly affixed to the interior of the membrane distillation housing with an adhesive resin was prepared and evaluated.

A membrane distillation module was prepared by using a thermosetting epoxy resin as the adhesive resin and affixing both ends of the hollow fiber membrane bundle to the housing by centrifugal adhesion, using, as the membrane distillation housing, a stainless steel (SUS) housing having an outer diameter of 60 mm, an inner diameter of 54 mm, a length of 360 mm, and a vapor outlet area of 0.0030 mm$^2$. In this membrane distillation module, the coefficient of linear expansion of the adhesive was $80 \times 10^{-6}$ [11° C.], and the coefficient of linear expansion of the housing was $17 \times 10^{-6}$ [1/° C.].

A membrane distillation apparatus was assembled using this membrane distillation module, and membrane distillation was carried out.

The flux at 1 hour from the start of membrane distillation was 30 kg/m$^2$/h, and the conductivity of the obtained distilled water was 7.0 µS/cm at 25° C. However, 250 hours after the start of membrane distillation, peeling occurred at the interface between the housing and the adhesive layer, and the treatment target water leaked to the permeation side, so operation was terminated.

Example 11

A membrane cartridge for membrane distillation of the same type as Example 1 was used as the membrane cartridge for membrane distillation.

Using an FKM O-ring with a G-60 standard and a durometer hardness A70, this membrane cartridge for membrane distillation was housed in the membrane distillation housing to prepare a membrane distillation module.

The membrane distillation housing used in the present Example was composed of a housing body and two upper and lower housing lids. The housing body had a cooler in addition to the housing part of the membrane cartridge for membrane distillation, and the gas phase unit of the membrane cartridge for membrane distillation and the gas phase unit of a cooler were connected via a vapor passage. The housing part of the membrane cartridge for membrane distillation of the membrane distillation housing was composed of a polycarbonate (polycarbonate) tube having an inner diameter of 140 mm, a thickness of 5 mm, and a length of 310 mm. The cooler was composed of 360 SUS304 pipes having an outer diameter of 1.2 mm, a thickness of 0.2 mm, and an effective length of 300 mm, and the total heat transfer area thereof was 0.41 m$^2$. The area of the vapor passage was 0.04340 m$^2$ (approximately 14 cm×31 cm).

The inner diameter of the membrane cartridge for membrane distillation insertion portion of the housing was 61 mm, and the coefficient of linear expansion of this portion was $70 \times 10^{-6}$ [1/° C.].

A membrane distillation apparatus was assembled using the obtained membrane distillation module, and membrane distillation was carried out.

The flux at 1 hour from the start of membrane distillation was 37 kg/m$^2$/h, and the conductivity of the obtained distilled water was 5.4 µS/cm at 25° C. The one-hour flux from the lapse of 1,000 hours after the start of membrane distillation was 30 kg/m$^2$/h, and the conductivity of the obtained distilled water was 7.6 µS/cm at 25° C.

From the above results, it was verified that the membrane distillation module of Example 11 could maintain its function well even after 1,000 hours of operation.

Example 12

A membrane distillation module was prepared in the same manner as in Example 11 except that an NBR O-ring having a G-60 standard and a durometer hardness of A90 was used as a sealing member, and a membrane distillation apparatus was assembled, and membrane distillation was carried out.

The flux at 1 hour from the start of membrane distillation was 35 kg/m$^2$/h, and the conductivity of the obtained distilled water was 4.8 µS/cm at 25° C. The one-hour flux from the lapse of 1,000 hours after the start of membrane distillation was 29 kg/m$^2$/h, and the conductivity of the obtained distilled water was 7.3 µS/cm at 25° C.

From the above results, it was verified that the membrane distillation module of Example 12 could maintain its function well even after 1,000 hours of operation.

Example 13

A membrane distillation module was prepared in the same manner as in Example 11 except that an EPDM O-ring having a G-60 standard and a durometer hardness of A70 was used as the sealing member, and a SUS304 pipe having an inner diameter of 140 mm, a thickness of 3 mm, and a length of 310 mm was used for the housing part of the membrane cartridge for membrane distillation of the housing body, a membrane distillation apparatus was assembled, and membrane distillation was carried out.

The flux at 1 hour from the start of membrane distillation was 33 kg/m$^2$/h, and the conductivity of the obtained distilled water was 3.2 µS/cm at 25° C. The one-hour flux from the lapse of 1,000 hours after the start of membrane distillation was 26 kg/m$^2$/h, and the conductivity of the obtained distilled water was 5.5 µS/cm at 25° C.

From the above results, it was verified that the membrane distillation module of Example 13 could maintain its function well even after 1,000 hours of operation.

Example 14

5,000 porous hollow fiber membranes identical to those in Example 1 were cut to a length of 80 cm and hydrophobized in the same manner as in Example 1 to obtain a hollow fiber hydrophobic porous membrane (hollow fiber membrane).

[Cartridge Production]

A membrane cartridge for membrane distillation having the configuration shown in FIG. 9 was prepared. Six stainless steel pipes having an outer diameter of 8 mm, an inner diameter of 6 mm, and a length of 600 mm were used as rod-shaped structures (17), which functioned as side core rods.

The 5,000 hollow fiber membranes described above were bundled, and the outer circumference of the side surfaces thereof were covered with a net having a fiber diameter of 100 μm, a length of 600 mm and a width of 600 mm. The ends thereof were affixed together with a side core rod with an affixation resin composed of a thermosetting epoxy resin to form a membrane affixation part. At this time, the ends of the net and the ends of the stainless steel pipes were embedded in the membrane affixation part at a depth of 50 mm per end. Thereafter, the longitudinal direction lengths of the membrane affixation part were adjusted to 100 mm per end by cutting both ends of the membrane affixation part by 5 mm together with the protrusions at both ends of the hollow fiber membrane bundle.

A membrane cartridge for membrane distillation (10) was prepared by covering the outer circumference of the bundle of the hollow fibers, which were covered with the net, with a non-woven fabric (breathability 5.0 mL/cm$^2$·sec, length 490 mm×width 600 mm, polypropylene non-woven fabric), and tying and affixing with twine.

The full length of the obtained cartridge was 700 mm, the outer diameter of the membrane affixation part at the ends of the cartridge was 130 mm, the thickness of the membrane affixation part was 100 mm, the distance between the membrane affixation parts at the ends (effective length of the hollow fiber membrane) was 500 mm, the filling rate of the hollow fiber membrane bundle was 50%, and the effective surface area of the hollow fiber membrane was 5.50 m$^2$. The coefficient of linear expansion of the affixation resin of the membrane affixation part of the cartridge was 80×10$^{-6}$ [1/° C.].

The membrane cartridge for membrane distillation was housed in a membrane distillation housing using an EPDM O-ring having a P-130 standard and a durometer hardness of A70 to prepare a membrane distillation module.

The membrane distillation housing used in the present Example was composed of a housing body and two upper and lower housing lids. The housing body has a cooler in addition to the housing part of the membrane cartridge for membrane distillation, and the gas phase unit of a membrane cartridge for membrane distillation and the gas phase unit of a cooler were connected via a vapor passage.

The membrane distillation housing was composed of a housing body and two upper and lower housing lids. The housing body had a cooler in addition to the housing part of the membrane cartridge for membrane distillation, and the gas phase unit of a membrane cartridge for membrane distillation and the gas phase unit of a cooler were connected via a vapor passage.

The housing part of the membrane cartridge for membrane distillation of the membrane distillation housing was composed of a SUS304 tube. The cooler was composed of 139 SUS304 pipes having an outer diameter of 17.3 mm, a thickness of 1.2 mm, and a length of 500 mm, and the total heat transfer area was 3.84 m$^2$. The area of the vapor passage was 0.100 m$^2$ (approximately 20 cm×50 cm).

The inner diameter of the membrane cartridge for membrane distillation insertion portion of this housing was 136 mm, and the coefficient of linear expansion of the portion was 14×10$^{-6}$ [1/° C.].

The flux at 1 hour from the start of membrane distillation was 25 kg/m$^2$/h, and the conductivity of the obtained distilled water was 4.6 μS/cm at 25° C. The one-hour flux from the lapse of 1,000 hours after the start of membrane distillation was 21 kg/m$^2$/h, and the conductivity of the obtained distilled water was 7.2 μS/cm at 25° C.

From the above results, it was verified that the membrane distillation module of Example 14 could maintain its function well even after 1,000 hours of operation.

Comparative Example 2

A membrane distillation cartridge was prepared in the same manner as in Example 14 except that an affixation resin composed of a thermosetting urethane resin was used as the membrane affixation resin in [Cartridge Production], the outer diameter of the membrane affixation part was 135.4 mm, and the filling rate of the hollow fiber membrane bundle was 46.1%, using this, a membrane distillation apparatus was assembled in the same manner as in Example 14, and membrane distillation was carried out.

The flux at 1 hour from the start of membrane distillation was 29 kg/m$^2$/h, and the conductivity of the obtained distilled water was 4.4 μS/cm at 25° C. However, when 460 hours had lapsed since the start of membrane distillation, a crack occurred in the adhesive layer and the treatment target water leaked to the permeation side, so operation was terminated.

The above effects are shown in summary in tables 1 to 5 below.

TABLE 1

| | | | | Ex 1 | Ex 2 |
|---|---|---|---|---|---|
| Membrane Distillation Module | Type of Membrane Distillation Apparatus (Ref Drawing) | | | FIG. 20 | FIG. 20 |
| | Membrane Cartridge for Membrane Distillation | Hydrophobic Porous Membrane | Shape | Hollow Fiber | Hollow Fiber |
| | | | Inner Diameter (mm) | 0.7 | 0.7 |
| | | | Outer Diameter (mm) | 1.3 | 1.3 |
| | | | Effective Length (mm) | 300 | 300 |
| | | | Number | 500 | 500 |
| | | | Total Membrane Surface Area (m$^2$) | 0.330 | 0.330 |
| | | | Filling Rate (%) | 24.0% | 28.6% |
| | | Net | | Present | Present |
| | | Non-Woven Fabric | | Present | Present |
| | | Rod-Shaped Structure | Presence/Absence | Present | Present |
| | | | Shape or Function | Side Core Rod | Side Core Rod |

TABLE 1-continued

|  |  |  |  | | |
|---|---|---|---|---|---|
| | | Membrane Affixation Part | Material | Epoxy | Epoxy |
| | | | Coefficient of Linear Expansion ($k_F$, 1/° C.) | 0.000080 | 0.000080 |
| | | | Equivalent circle Diameter of Outer Circumference $d_F$ (Outer Diameter, mm) | 60 | 60 |
| | | Cartridge Case | Material | — | Polysulfone |
| | | | Opening Area(m$^2$) | — | 0.043353979 |
| | Housing | | Material | Polycarbonate | Polycarbonate |
| | | | Coefficient of Linear Expansion ($k_E$, 1/° C.) | 0.000070 | 0.000070 |
| | | | Equivalent circle Diameter of Inner Circumference $d_E$ (Inner Diameter, mm) | 61 | 61 |
| | | | Cross-Sectional Area of Vapor Outlet (m$^2$) | 0.00300 | 0.00300 |
| | | | Demister | Absent | Absent |
| | | | Cooling Part | Absent | Absent |
| | | | Heat-Insulation Layer | Present | Present |
| | Sealing Member | | Standard | P-60 | P-60 |
| | | | Material | FKM | FKM |
| | | | Position | Side | Side |
| | | | Durometer Hardness | A70 | A70 |
| | | | Length | 5.7 | 5.7 |
| | $d_E - d_F$ (mm) | | | 1 | 1 |
| | $d_F \times (k_F - k_E)$ (mm) | | | 0.00060 | 0.00060 |
| | C. (° C.) = (dE − dF)/(dF × (kF − kE)) | | | 1667 | 1667 |
| Evaluation Results | 1 Hour from Start of Membrane Distillation | | Flux (LMH) | 33 | 31 |
| | | | Distilled Water Conductivity (µS/cm) | 3.0 | 2.5 |
| | 1 Hour after 1000 hours | | Flux (LMH) | 28 | 27 |
| | | | Distilled Water Conductivity (µS/cm) | 8.0 | 6.0 |

|  |  |  |  | Ex 3 | Ex 4 |
|---|---|---|---|---|---|
| Membrane Distillation Module | Type of Membrane Distillation Apparatus (Ref Drawing) | | | FIG. 20 | FIG. 20 |
| | Membrane Cartridge for Membrane Distillation | Hydrophobic Porous Membrane | Shape | Hollow Fiber | Hollow Fiber |
| | | | Inner Diameter (mm) | 0.7 | 0.7 |
| | | | Outer Diameter (mm) | 1.3 | 1.3 |
| | | | Effective Length (mm) | 300 | 300 |
| | | | Number | 500 | 500 |
| | | | Total Membrane Surface Area (m$^2$) | 0.330 | 0.330 |
| | | | Filling Rate (%) | 28.6% | 28.6% |
| | | Net | | Present | Present |
| | | Non-Woven Fabric | | Present | Present |
| | | Rod-Shaped Structure | Presence/Absence | Present | Present |
| | | | Shape or Function | Side Core Rod | Side Core Rod |
| | | Membrane Affixation Part | Material | Epoxy | Epoxy |
| | | | Coefficient of Linear Expansion ($k_F$, 1/° C.) | 0.000080 | 0.000080 |
| | | | Equivalent circle Diameter of Outer Circumference $d_F$ (Outer Diameter, mm) | 60 | 60 |
| | | Cartridge Case | Material | Polysulfone | Polysulfone |
| | | | Opening Area(m$^2$) | 0.043353979 | 0.043353979 |
| | Housing | | Material | Titanium | Polycarbonate |
| | | | Coefficient of Linear Expansion ($k_E$, 1/° C.) | 0.000009 | 0.000070 |
| | | | Equivalent circle Diameter of Inner Circumference $d_E$ (Inner Diameter, mm) | 61 | 61 |
| | | | Cross-Sectional Area of Vapor Outlet (m$^2$) | 0.00300 | 0.00300 |
| | | | Demister | Absent | Absent |
| | | | Cooling Part | Absent | Absent |
| | | | Heat-Insulation Layer | Present | Present |
| | Sealing Member | | Standard | P-60 | P-50A |
| | | | Material | FKM | FKM |
| | | | Position | Side | End |
| | | | Durometer Hardness | A70 | A70 |
| | | | Length | 5.7 | 5.7*) |
| | $d_E - d_F$ (mm) | | | 1 | 1 |
| | $d_F \times (k_F - k_E)$ (mm) | | | 0.00429 | 0.00060 |
| | C. (° C.) = (dE − dF)/(dF × (kF − kE)) | | | 233 | 1667 |
| Evaluation Results | 1 Hour from Start of Membrane Distillation | | Flux (LMH) | 30 | 33 |
| | | | Distilled Water Conductivity (µS/cm) | 2.0 | 5.0 |
| | 1 Hour after 1000 hours | | Flux (LMH) | 25 | 26 |
| | | | Distilled Water Conductivity (µS/cm) | 5.0 | 6.4 |

TABLE 2

|  |  |  |  | Ex 5 | Ex 6 |
|---|---|---|---|---|---|
| Membrane Distillation Module | Type of Membrane Distillation Apparatus (Ref Drawing) | | | FIG. 20 | FIG. 20 |
| | Membrane Cartridge for | Hydrophobic Porous Membrane | Shape | Hollow Fiber | Hollow Fiber |
| | | | Inner Diameter (mm) | 0.7 | 0.7 |
| | | | Outer Diameter (mm) | 1.3 | 1.3 |

TABLE 2-continued

|  |  |  |  |  |  |
|---|---|---|---|---|---|
|  | Membrane Distillation |  | Effective Length (mm) | 300 | 300 |
|  |  |  | Number | 500 | 500 |
|  |  |  | Total Membrane Surface Area (m²) | 0.330 | 0.330 |
|  |  |  | Filling Rate (%) | 32.2% | 31.3% |
|  |  | Net |  | Present | Present |
|  |  | Non-Woven Fabric |  | Present | Present |
|  |  | Rod-Shaped Structure | Presence/Absence | Present | Present |
|  |  |  | Shape or Function | Hollow Perforated | Porous Structure |
|  |  | Membrane Affixation Part | Material | Epoxy | Epoxy |
|  |  |  | Coefficient of Linear Expansion ($k_F$, 1/°C.) | 0.000080 | 0.000080 |
|  |  |  | Equivalent circle Diameter of Outer Circumference $d_F$ (Outer Diameter, mm) | 60 | 60 |
|  |  | Cartridge Case | Material | Polysulfone | Polysulfone |
|  |  |  | Opening Area (m²) | 0.043353979 | 0.043353979 |
|  | Housing |  | Material | Polycarbonate | Polycarbonate |
|  |  |  | Coefficient of Linear Expansion ($k_E$, 1/°C.) | 0.000070 | 0.000070 |
|  |  |  | Equivalent circle Diameter of Inner Circumference $d_E$ (Inner Diameter, mm) | 61 | 61 |
|  |  |  | Cross-Sectional Area of Vapor Outlet (m²) | 0.00316 | 0.00300 |
|  |  |  | Demister | Absent | Absent |
|  |  |  | Cooling Part | Absent | Absent |
|  |  |  | Heat-Insulation Layer | Present | Present |
|  | Sealing Member |  | Standard | P-60 | P-60 |
|  |  |  | Material | FKM | FKM |
|  |  |  | Position | Side | Side |
|  |  |  | Durometer Hardness | A70 | A70 |
|  |  |  | Length | 5.7 | 5.7 |
|  | $d_E − d_F$ (mm) |  |  | 1 | 1 |
|  | $d_F × (k_F − k_E)$ (mm) |  |  | 0.00060 | 0.00060 |
|  | C. (°C.) = $(dE − dF)/(dF × (kF − kE))$ |  |  | 1667 | 1667 |
| Evaluation Results | 1 Hour from Start of Membrane Distillation |  | Flux (LMH) | 34 | 35 |
|  |  |  | Distilled Water Conductivity (μS/cm) | 4.3 | 5.0 |
|  | 1 Hour after 1000 hours |  | Flux (LMH) | 29 | 28 |
|  |  |  | Distilled Water Conductivity (μS/cm) | 6.2 | 5.5 |

|  |  |  |  | Ex 7 | Ex 8 |
|---|---|---|---|---|---|
| Membrane Distillation Module | Type of Membrane Distillation Apparatus (Ref Drawing) |  |  | FIG. 20 | FIG. 20 |
|  | Membrane Cartridge for Membrane Distillation | Hydrophobic Porous Membrane | Shape | Hollow Fiber | Hollow Fiber |
|  |  |  | Inner Diameter (mm) | 0.7 | 0.7 |
|  |  |  | Outer Diameter (mm) | 1.3 | 1.3 |
|  |  |  | Effective Length (mm) | 300 | 300 |
|  |  |  | Number | 500 (100 × 5) | 500 |
|  |  |  | Total Membrane Surface Area (m²) | 0.330 | 0.330 |
|  |  |  | Filling Rate (%) | 28.6% | 28.6% |
|  |  | Net |  | Present | Present |
|  |  | Non-Woven Fabric |  | Present | Present |
|  |  | Rod-Shaped Structure | Presence/Absence | Present | Present |
|  |  |  | Shape or Function | Side Core Rod | Side Core Rod |
|  |  | Membrane Affixation Part | Material | Epoxy | Epoxy |
|  |  |  | Coefficient of Linear Expansion ($k_F$, 1/°C.) | 0.000080 | 0.000080 |
|  |  |  | Equivalent circle Diameter of Outer Circumference $d_F$ (Outer Diameter, mm) | 60 | 60 |
|  |  | Cartridge Case | Material | Polysulfone | Polysulfone |
|  |  |  | Opening Area (m²) | 0.043353979 | 0.043353979 |
|  | Housing |  | Material | Polycarbonate | Polycarbonate |
|  |  |  | Coefficient of Linear Expansion ($k_E$, 1/°C.) | 0.000070 | 0.000070 |
|  |  |  | Equivalent circle Diameter of Inner Circumference $d_E$ (Inner Diameter, mm) | 61 | 61 |
|  |  |  | Cross-Sectional Area of Vapor Outlet (m²) | 0.00300 | 0.00300 |
|  |  |  | Demister | Absent | Present |
|  |  |  | Cooling Part | Absent | Absent |
|  |  |  | Heat-Insulation Layer | Present | Present |
|  | Sealing Member |  | Standard | P-60 | P-60 |
|  |  |  | Material | FKM | FKM |
|  |  |  | Position | Side | Side |
|  |  |  | Durometer Hardness | A70 | A70 |
|  |  |  | Length | 5.7 | 5.7 |
|  | $d_E − d_F$ (mm) |  |  | 1 | 1 |
|  | $d_F × (k_F − k_E)$ (mm) |  |  | 0.00060 | 0.00060 |
|  | C. (°C.) = $(dE − dF)/(dF × (kF − kE))$ |  |  | 1667 | 1667 |
| Evaluation Results | 1 Hour from Start of Membrane Distillation |  | Flux (LMH) | 34 | 30 |
|  |  |  | Distilled Water Conductivity (μS/cm) | 3.8 | 2.2 |
|  | 1 Hour after 1000 hours |  | Flux (LMH) | 27 | 22 |
|  |  |  | Distilled Water Conductivity (μS/cm) | 7.0 | 4.3 |

TABLE 3

|  |  |  |  | Ex 9 | Ex 10 | Comp Ex 1 |
|---|---|---|---|---|---|---|
| Membrane Distillation Module | Type of Membrane Distillation Apparatus (Ref Drawing) |  |  | FIG. 20 | FIG. 20 | — |
|  | Membrane Cartridge for Membrane Distillation | Hydrophobic Porous Membrane | Shape | Hollow Fiber | Hollow Fiber | Hollow Fiber |
|  |  |  | Inner Diameter (mm) | 0.7 | 0.7 | 0.7 |
|  |  |  | Outer Diameter (mm) | 1.3 | 1.3 | 1.3 |
|  |  |  | Effective Length (mm) | 300 | 300 | 300 |
|  |  |  | Number | 500 | 500 | 500 |
|  |  |  | Total Membrane Surface Area (m²) | 0.330 | 0.330 | 0.330 |
|  |  |  | Filling Rate (%) | 28.6% | 24.0% | 28.6% |
|  |  | Net |  | Present | Present | Absent |
|  |  | Non-Woven Fabric |  | Present | Present | Absent |
|  |  | Rod-Shaped Structure | Presence/Absence | Present | Present | Absent |
|  |  |  | Shape or Function | Side Core Rod | Side Core Rod | — |
|  |  | Membrane Affixation Part | Material | Epoxy | Urethane | Epoxy |
|  |  |  | Coefficient of Linear Expansion ($k_F$, 1/° C.) | 0.000080 | 0.000200 | 0.000080 |
|  |  |  | Equivalent circle Diameter of Outer Circumference $d_F$ (Outer Diameter, mm) | 60 | 60 | 60 |
|  |  | Cartridge Case | Material | — | — | — |
|  |  |  | Opening Area (m²) | — | — | — |
|  | Housing | Material |  | Polycarbonate | Titanium | SUS |
|  |  | Coefficient of Linear Expansion ($k_E$, 1/° C.) |  | 0.000070 | 0.000009 | 0.000018 |
|  |  | Equivalent circle Diameter of Inner Circumference $d_E$ (Inner Diameter, mm) |  | 61 | 61 | 60 |
|  |  | Cross-Sectional Area of Vapor Outlet (m²) |  | 0.00200 | 0.00300 | 0.00300 |
|  |  | Demister |  | Absent | Absent | Absent |
|  |  | Cooling Part |  | Absent | Absent | Absent |
|  |  | Heat-Insulation Layer |  | Present | Present | Absent |
|  | Sealing Member | Standard |  | P-60 | P-60 | Absent |
|  |  | Material |  | FKM | Silicone | — |
|  |  | Position |  | Side | Side | — |
|  |  | Durometer Hardness |  | A70 | A40 | — |
|  |  | Length |  | 5.7 | 5.7 | — |
|  | $d_E - d_F$ (mm) |  |  | 1 | 1 | 0 |
|  | $d_F \times (k_F - k_E)$ (mm) |  |  | 0.00060 | 0.01149 | 0.00372 |
|  | C. (° C.) = $(d_E - d_F)/(d_F \times (k_F - k_E))$ |  |  | 1667 | 87 | 0 |
| Evaluation Results | 1 Hour from Start of Membrane Distillation | Flux (LMH) |  | 18 | 31 | 30 |
|  |  | Distilled Water Conductivity (μS/cm) |  | 7.0 | 2.8 | 7.0 |
|  | 1 Hour after 1000 hours | Flux (LMH) |  | 15 | 28 | — |
|  |  | Distilled Water Conductivity (μS/cm) |  | 9.2 | 6.5 | — |

TABLE 4

|  |  |  |  | Ex 11 | Ex 12 | Ex 13 |
|---|---|---|---|---|---|---|
| Membrane Distillation Module | Type of Membrane Distillation Apparatus (Ref Drawing) |  |  | FIG. 21 | FIG. 21 | FIG. 21 |
|  | Membrane Cartridge for Membrane Distillation | Hydrophobic Porous Membrane | Shape | Hollow Fiber | Hollow Fiber | Hollow Fiber |
|  |  |  | Inner Diameter (mm) | 0.7 | 0.7 | 0.7 |
|  |  |  | Outer Diameter (mm) | 1.3 | 1.3 | 1.3 |
|  |  |  | Effective Length (mm) | 300 | 300 | 300 |
|  |  |  | Number | 500 | 500 | 500 |
|  |  |  | Total Membrane Surface Area (m²) | 0.330 | 0.330 | 0.330 |
|  |  |  | Filling Rate (%) | 28.6% | 28.6% | 28.6% |
|  |  | Net |  | Present | Present | Present |
|  |  | Non-Woven Fabric |  | Present | Present | Present |
|  |  | Rod-Shaped Structure | Presence/Absence | Present | Present | Present |
|  |  |  | Shape or Function | Side Core Rod | Side Core Rod | Side Core Rod |
|  |  | Membrane Affixation Part | Material | Epoxy | Epoxy | Epoxy |
|  |  |  | Coefficient of Linear Expansion ($k_F$, 1/° C.) | 0.000080 | 0.000080 | 0.000080 |
|  |  |  | Equivalent circle Diameter of Outer Circumference $d_F$ (Outer Diameter, mm) | 60 | 60 | 60 |
|  |  | Cartridge Case | Material | — | — | — |
|  |  |  | Opening Area (m²) | — | — | — |
|  | Housing | Material |  | Polycarbonate | Polycarbonate | Stainless |
|  |  | Coefficient of Linear Expansion ($k_E$, 1/° C.) |  | 0.000070 | 0.000070 | 0.000014 |
|  |  | Equivalent circle Diameter of Inner Circumference $d_E$ (Inner Diameter, mm) |  | 61 | 61 | 61 |
|  |  | Cross-Sectional Area of Vapor Passage (m²) |  | 0.04340 | 0.04340 | 0.04340 |
|  |  | Demister |  | Absent | Absent | Absent |
|  |  | Cooling Part |  | Present | Present | Present |
|  |  | Heat-Insulation Layer |  | Absent | Absent | Absent |

TABLE 4-continued

|  |  |  | Ex 11 | Ex 12 | Ex 13 |
|---|---|---|---|---|---|
|  | Sealing Member | Standard | G-60 | G-60 | G-60 |
|  |  | Material | FKM | NBR | EPDM |
|  |  | Position | Side | Side | Side |
|  |  | Durometer Hardness | A70 | A90 | A70 |
|  |  | Length | 3.1 | 3.1 | 3.1 |
|  | $d_E - d_F$ (mm) |  | 1 | 1 | 1 |
|  | $d_F \times (k_F - k_E)$ (mm) |  | 0.00060 | 0.00060 | 0.00396 |
|  | C. (° C.) = $(dE - dF)/(dF \times (kF - kE))$ |  | 1667 | 1667 | 253 |
| Evaluation Results | 1 Hour from Start of Membrane Distillation | Flux (LMH) | 37 | 35 | 33 |
|  |  | Distilled Water Conductivity (μS/cm) | 5.4 | 4.8 | 3.2 |
|  | 1 Hour after 1000 hours | Flux (LMH) | 30 | 29 | 26 |
|  |  | Distilled Water Conductivity (μS/cm) | 7.6 | 7.3 | 5.5 |

TABLE 5

|  |  |  |  | Ex 14 | Comp Ex 2 |
|---|---|---|---|---|---|
| Membrane Distillation Module | Type of Membrane Distillation Apparatus (Ref Drawing) |  |  | FIG. 21 | FIG. 21 |
|  | Membrane Cartridge for Membrane Distillation | Hydrophobic Porous Membrane | Shape | Hollow Fiber | Hollow Fiber |
|  |  |  | Inner Diameter (mm) | 0.7 | 0.7 |
|  |  |  | Outer Diameter (mm) | 1.3 | 1.3 |
|  |  |  | Effective Length (mm) | 500 | 500 |
|  |  |  | Number | 5000 | 5000 |
|  |  |  | Total Membrane Surface Area (m²) | 5.498 | 5.498 |
|  |  |  | Filling Rate (%) | 50.0% | 46.1% |
|  |  | Net |  | Present | Present |
|  |  | Non-Woven Fabric |  | Present | Present |
|  |  | Rod-Shaped Structure | Presence/Absence | Present | Present |
|  |  |  | Shape or Function | Side Core Rod | Side Core Rod |
|  |  | Membrane Affixation Part | Material | Epoxy | Urethane |
|  |  |  | Coefficient of Linear Expansion ($k_F$, 1/° C.) | 0.000080 | 0.000200 |
|  |  |  | Equivalent circle Diameter of Outer Circumference $d_F$ (Outer Diameter, mm) | 130 | 135.4 |
|  |  | Cartridge Case | Material | — | — |
|  |  |  | Opening Area (m²) | — | — |
|  | Housing | Material |  | Stainless | Stainless |
|  |  | Coefficient of Linear Expansion ($k_E$, 1/° C.) |  | 0.000014 | 0.000014 |
|  |  | Equivalent circle Diameter of Inner Circumference $d_E$ (Inner Diameter, mm) |  | 136 | 136 |
|  |  | Cross-Sectional Area of Vapor Passage (m²) |  | 0.10000 | 0.10000 |
|  |  | Demister |  | Absent | Absent |
|  |  | Cooling Part |  | Present | Present |
|  |  | Heat-Insulation Layer |  | Absent | Absent |
|  | Sealing Member | Standard |  | P-130 | P-130 |
|  |  | Material |  | EPDM | EPDM |
|  |  | Position |  | Side | Side |
|  |  | Durometer Hardness |  | A70 | A70 |
|  |  | Length |  | 5.7 | 5.7 |
|  | $d_E - d_F$ (mm) |  |  | 6 | 0.6 |
|  | $d_F \times (k_F - k_E)$ (mm) |  |  | 0.00858 | 0.02518 |
|  | C. (° C.) = $(dE - dF)/(dF \times (kF - kE))$ |  |  | 699 | 24 |
| Evaluation Results | 1 Hour from Start of Membrane Distillation | Flux (LMH) |  | 25 | 29 |
|  |  | Distilled Water Conductivity (μS/cm) |  | 4.6 | 4.4 |
|  | 1 Hour after 1000 hours | Flux (LMH) |  | 21 | — |
|  |  | Distilled Water Conductivity (μS/cm) |  | 7.2 | — |

REFERENCE SIGNS LIST 10 membrane cartridge for membrane distillation
11 hydrophobic porous membrane
11a small bundle of hollow fiber hydrophobic porous membranes
12 membrane affixation part
13 cartridge case
14 cartridge case aperture unit
15 net
16 non-woven fabric
17 rod-shaped structure
18 liquid phase unit spacer
19 gas phase unit spacer
20 membrane distillation housing
30 housing body
30a housing body flange
30b housing body chin
31 vapor outlet
32 demister
33 heat insulation layer
34 housing body aperture for circulation of treatment target water
35 cooler
35a plumbing
35b aperture
36 distilled water outlet
37 exhaust port 38 vapor passage
40 housing lid
40a housing lid flange
40b housing lid chin
41 lid aperture for circulation of treatment target water
50 sealing member
60 support unit
70 liquid phase unit
80 gas phase unit
100, 110, 120 membrane distillation module
200 vapor condensation unit
210 condensate tank
220 pressure regulator
230 decompression device
500, 600, 700 membrane distillation apparatus
A treatment target water
A' distilled treatment target water
B vapor separated from treatment target water
B* vapor separated from treatment target water, passing through the hydrophobic porous membrane, and diffusing into the gas phase unit
CW cooling water
E exhaust
$L_{EFF}$ effective length
$L_{ALL}$ full length
$L_{17}$ length of rod-shaped structure
S recovered solvent
$d_E$ equivalent circle diameter of inner circumference of membrane distillation housing
$d_F$ equivalent circle diameter of outer circumference of membrane affixation part
$d_{11a}$ diameter of small bundles of hollow fiber hydrophobic porous membranes
$h_{50}$ longitudinal direction height of sealing member 50
$w_{50}$ lateral direction width of sealing member 50

The invention claimed is:

1. A membrane distillation module comprising,
a membrane cartridge for membrane distillation, comprising a flat sheet or hollow fiber hydrophobic porous membrane, and
a membrane distillation housing which houses the membrane cartridge for membrane distillation, wherein
the membrane distillation housing is composed of metal,
the membrane distillation housing has a housing body for housing the membrane cartridge for membrane distillation and two housing lids attached to the housing body,
the membrane cartridge for membrane distillation has a membrane affixation part in which a hydrophobic porous membrane is affixed with an affixation resin,
there is a gap between the membrane distillation housing and the membrane cartridge for membrane distillation, and
in a cross-section perpendicular to an axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), a value C represented by the following formula:

$$C = \frac{d_E - d_F}{d_F(k_F - k_E)} \quad [\text{Formula 1}]$$

is 80° C. or higher and 1,000° C. or lower,
provided that when the gap between the inner surface of the housing and the outer circumference of the membrane affixation part differs depending on the measurement location, the value of the location where "$d_E - d_F$" is minimum is used for the values of $d_E$ and $d_F$.

2. A membrane distillation module comprising,
a membrane cartridge for membrane distillation, comprising a flat sheet or hollow fiber hydrophobic porous membrane, and
a membrane distillation housing which houses the membrane cartridge for membrane distillation, wherein
the membrane cartridge for membrane distillation:
  has a substantially columnar or substantially polygonal columnar shape, and
  has a membrane affixation part which affixes the hydrophobic porous membrane to the axial direction ends of the substantially columnar or substantially polygonal columnar shape with an affixation resin,
the membrane distillation housing is composed of metal,
the membrane distillation housing has a housing body for housing the membrane cartridge for membrane distillation and two housing lids attached to the housing body,
the membrane distillation module has a support unit which, when the membrane cartridge for membrane distillation is housed within the membrane distillation housing, affixes the membrane cartridge for membrane distillation within the membrane distillation housing by supporting an outer surface of the membrane affixation part on an inner surface of the membrane distillation housing via a sealing member,
the membrane distillation module is divided into a liquid phase unit through a treatment target liquid circulates and a gas phase unit in which vapor generated from the treatment target liquid passes through the hydrophobic porous membrane and diffuses by the hydrophobic porous membrane, the membrane affixation part, and the sealing member,
there is a gap between the membrane distillation housing and the membrane cartridge for membrane distillation, and
in a cross-section of the support unit perpendicular to the axial direction of the membrane cartridge for membrane distillation, when an equivalent circle diameter of an outer circumference of the membrane affixation part is $d_F$ (mm), the coefficient of linear expansion of the affixation resin is $k_F$ (1/° C.), an equivalent circle diameter of an inner circumference of the membrane distillation housing is $d_E$ (mm), and the coefficient of linear expansion of a material constituting the membrane distillation housing is $k_E$ (1/° C.), a value C represented by the following formula:

$$C = \frac{d_E - d_F}{d_F(k_F - k_E)} \quad [\text{Formula 2}]$$

is 80° C. or higher and 1,000° C. or lower,
provided that when the gap between the inner surface of the housing and the outer circumference of the membrane affixation part differs depending on the measurement location, the value of the location where "$d_E$-$d_F$" is minimum is used for the values of $d_E$ and $d_F$.

3. The membrane distillation module according to claim 2, wherein the sealing member is connected to an outer circumferential surface of the membrane affixation part of the membrane cartridge for membrane distillation, and
a length of the sealing member in the direction perpendicular to the axial direction of the membrane cartridge for membrane distillation is 1 mm or greater.

4. The membrane distillation module according to claim 2, wherein at least a part of a portion of the membrane cartridge for membrane distillation other than the axial direction ends is covered by at least one of a net and a non-woven fabric.

5. The membrane distillation module according to claim 2, wherein
the membrane cartridge further comprises at least one rod-shaped structure which is affixed with the affixation resin of the axial direction ends of the membrane cartridge for membrane distillation, and
a dimensional change in the axial direction of the membrane cartridge before and after the application of a compressive stress represented by the following formula is less than 5%:

compressive stress [kgf]=(cross-sectional area of membrane affixation part [cm$^2$])×{(pressure [kPa] of treatment target water in liquid phase unit)−(pressure of gas phase unit [kPa])}× 98.0665.

6. The membrane distillation module according to claim 2, wherein the flat sheet hydrophobic porous membrane is a pleated hydrophobic porous membrane.

7. The membrane distillation module according to claim 2, wherein the hydrophobic porous membrane is a spiral hydrophobic porous membrane.

8. The membrane distillation module according to claim 2, wherein the housing body has, on a side surface part thereof, a vapor outlet which is connected to the gas phase unit of the membrane distillation module and for discharging vapor in the gas phase unit to the outside of the membrane distillation module, and
the aperture area of the vapor outlet is 1/250 or more of the membrane surface area of the hydrophobic porous membrane.

9. The membrane distillation module according to claim 2, wherein the housing body comprises:
a cooler which is connected to the gas phase unit of the membrane distillation module and for condensing the vapor in the gas phase unit, and
a distilled water discharge unit for discharging distilled water which is condensed from the vapor by the cooler.

10. The membrane distillation module according to claim 9, wherein the housing body has an exhaust port for decompressing the gas phase unit.

11. The membrane distillation module according to claim 8, wherein the housing body has a demister.

12. The membrane distillation module according to claim 2, wherein the hydrophobic porous membrane is composed of a plurality of hollow fiber hydrophobic porous membranes, and
the plurality of hollow fiber hydrophobic porous membranes are divided into a plurality of small bundles, and the plurality of small bundles are dispersedly arranged in a cross-section of the membrane affixation part in a direction perpendicular to the axial direction of the membrane cartridge for membrane distillation.

13. The membrane distillation module according to claim 2, wherein at least a part of the outside of the membrane distillation housing has a heat insulation layer.

14. A membrane distillation apparatus, comprising at least:
(A) the membrane distillation module according to any one of claims 2 to 5, 6, 7, 8, 11, 12, and 13, and a vapor condensation unit for condensing vapor generated from the membrane distillation module, or
(B) the membrane distillation module according to claim 9 or 2.

15. The membrane distillation module according to claim 5, wherein
the rod-shaped structure is affixed with the affixation resin at both axial direction ends thereof,
the number of the rod-shaped structure is 2 to 6, and
the rod-shaped structure function as a side core rod.

* * * * *